（12）United States Patent
Berry et al.

(10) Patent No.: US 9,409,206 B2
(45) Date of Patent: Aug. 9, 2016

(54) METHODS AND SYSTEMS FOR APPLYING AERODYNAMICALLY FUNCTIONAL COATINGS TO A SURFACE

(71) Applicant: The Boeing Company, Chicago, IL (US)

(72) Inventors: Douglas H. Berry, Seattle, WA (US); Scott A. Davis, Everett, WA (US)

(73) Assignee: The Boeing Company, Chicago, IL (US)

( * ) Notice: Subject to any disclaimer, the term of this patent is extended or adjusted under 35 U.S.C. 154(b) by 324 days.

(21) Appl. No.: 13/875,774

(22) Filed: May 2, 2013

(65) Prior Publication Data

US 2014/0329055 A1 Nov. 6, 2014

(51) Int. Cl.
*B05D 5/06* (2006.01)
*B05D 1/32* (2006.01)
*B05D 3/12* (2006.01)
*B05D 7/00* (2006.01)

(52) U.S. Cl.
CPC ... *B05D 1/32* (2013.01); *B05D 3/12* (2013.01); *B05D 5/065* (2013.01); *B05D 7/57* (2013.01); *B05D 2202/00* (2013.01); *Y10T 428/24628* (2015.01)

(58) Field of Classification Search
CPC ........... B05D 5/06; B05D 5/066; B05D 5/065
USPC ........................................ 427/162, 402, 256
See application file for complete search history.

(56) References Cited

U.S. PATENT DOCUMENTS

| 7,350,890 | B2* | 4/2008 | Baird et al. ................. 347/8 |
| 2002/0132570 | A1* | 9/2002 | Berg et al. ............... 451/344 |
| 2007/0248830 | A1* | 10/2007 | Brier et al. .............. 428/457 |
| 2010/0304039 | A1 | 12/2010 | Bausen et al. |
| 2011/0036947 | A1* | 2/2011 | Knight .................... 244/130 |

FOREIGN PATENT DOCUMENTS

| EP | 1810757 A1 | 7/2007 |
| GB | 2399040 A | 9/2004 |
| WO | 2011/008271 A1 | 1/2011 |

OTHER PUBLICATIONS

International Search Report and Written Opinion of the International Searching Authority, mailed Sep. 18, 2014, for counterpart international application PCT/US2014/036061,11 pages.

(Continued)

*Primary Examiner* — Cachet Sellman

(57) ABSTRACT

A method for applying an aerodynamically functional coating to an exterior surface is provided. The method includes preparing an uncoated substrate surface to obtain a prepared substrate surface; applying a primer on the prepared substrate surface to obtain a primed substrate surface with a primer layer; applying and curing a basecoat field color to obtain a basecoat field color layer; masking for a basecoat design color on the basecoat field color layer; applying and curing the basecoat design color to obtain a first basecoat design color layer; masking for, applying, and curing any subsequent basecoat design color layers on the basecoat field color layer; applying and curing a clearcoat to obtain a first clearcoat layer; mechanically aero-contouring a plurality of coating edges to obtain an aero-contoured surface; and, applying additional clearcoat to obtain one or more additional clearcoat layers.

14 Claims, 14 Drawing Sheets

(56) References Cited

OTHER PUBLICATIONS

PCT International Preliminary Report on Patentability Search Report and Written Opinion of the International Searching Authority for Corresponding International Application No. PCT/US2014/036061, Mailed Nov. 12, 2015, Applicant The Boeing Company, 8 pages.

Holmes, Bruce J., et al., "Manufacturing Tolerances for Natural Laminar Flow Airframe Surface", SAE Paper 850863 Presented at 1985 SAE General Aviation Meeting, Wichita, Kansas, Apr. 16-19, 1985, 11 pages.

NASA CR-1999-209325, "High Reynolds Number Hybrid Laminar Flow Control (HLFC) Flight Experiment III. Leading Edge Design, Fabrication, and Installation", Prepared for Langley Research Center under Contract NAS1-18574, Apr. 1999, 92 pages.

Joslin, Ronald D., "Overview of Laminar Flow Control", NASA/TP-1998-208705, Langley Research Center, Hampton, Virginia, Oct. 1998, 142 pages.

Obara, Clifford J., et al., "Roughness and Waviness Requirements for Laminar Flow Surfaces", NASA Conference Publication CP2397, in its Langley Symposium on Aerodynamics, vol. 1, Accession No. N88-14953, Dec. 1986, pp. 519-537.

Arnal, D., et al., "Laminar-Turbulent Transition Control: NLF, LFC, HLFC", RTO-EN-AVT-151, NATO-OTAN, 2008, pp. 15-1 to 15-21.

\* cited by examiner

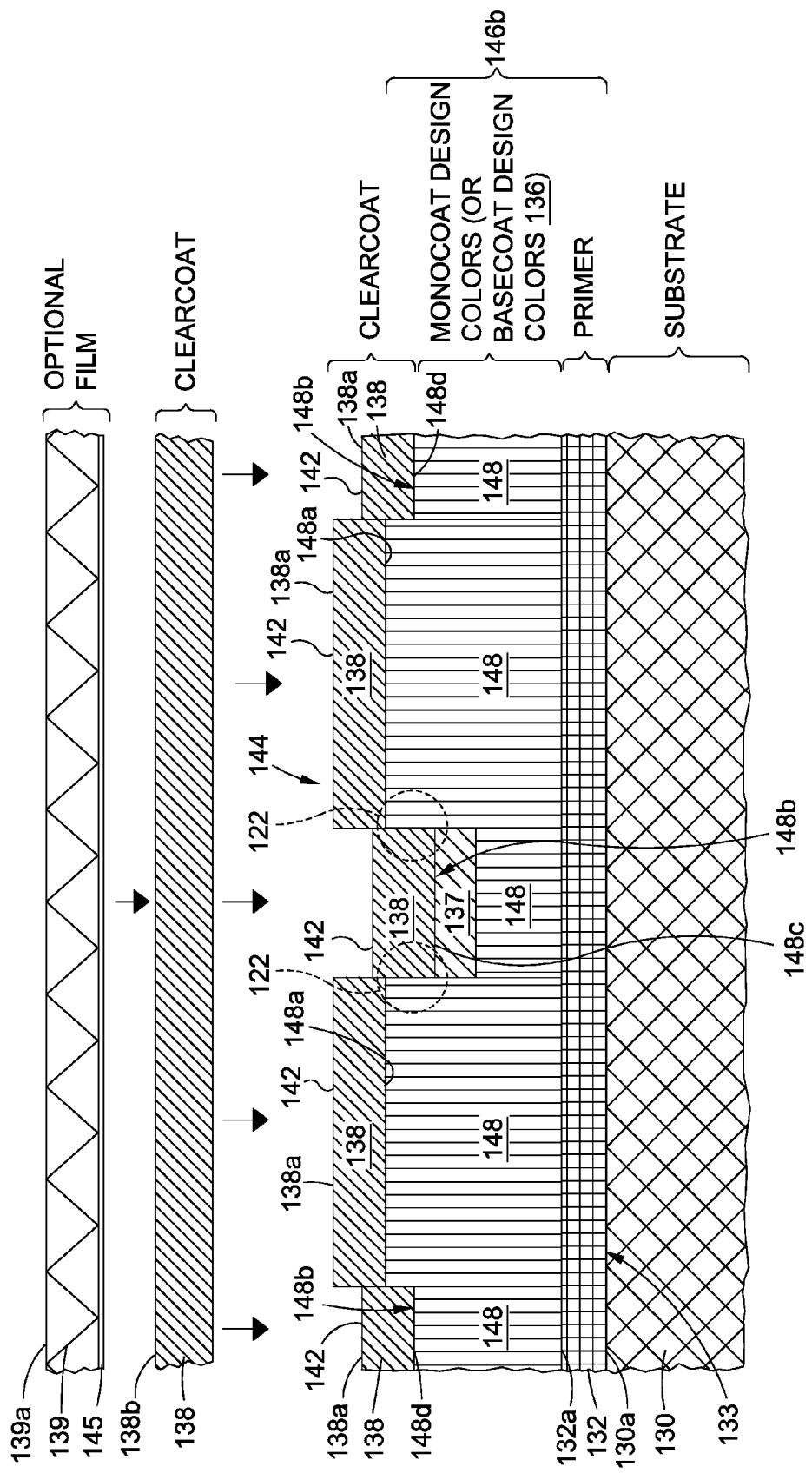

METHODS AND SYSTEMS FOR APPLYING AERODYNAMICALLY FUNCTIONAL COATINGS TO A SURFACE

BACKGROUND

1) Field of the Disclosure

The disclosure relates generally to methods and systems for coating surfaces of structures, and more specifically, to methods and systems for applying aerodynamically functional coatings to exterior surfaces of structures, such as air vehicles.

2) Description of Related Art

Air vehicles, such as commercial passenger and cargo aircraft, may have exterior surfaces that are coated or painted with colorful and decorative designs. For example, such exterior surfaces of an air vehicle may include exterior surfaces of the tail, wings, fuselage, nacelles, or other exterior surfaces of the air vehicle. Such colorful and decorative designs may include airline livery designs which are standard paint schemes on aircraft that prominently display an airline's logo, name, or other identifying feature to provide branding and differentiation of the airline. Since airline livery designs may provide not only a decorative function, but also a branding and differentiation function, it is important that livery designs be consistently applied and with acceptable appearance, gloss, and long-term durability.

In addition, maintaining desired flow characteristics over coated or painted aircraft surfaces, such as airline livery designs, for example, coated or painted on the tail of an aircraft, may be challenging. In order to avoid impact on desired boundary layer characteristics during flight, there are allowable criteria for paint edges and waviness. There may also exist restrictions for three-dimensional surface discontinuities, such as those that may occur from inclusions caused by debris, dust, or dry coating overspray, may be more stringent than for steps or for waviness.

Known methods and systems exist for applying multi-color airline livery designs on exterior surfaces of aircraft. For example, such known methods and systems may include building up coating or paint layers on either a primer layer or a basecoat field color layer using either tape or a premask to mask out the airline livery design. These known methods and systems for applying multi-color airline livery designs on exterior surfaces of aircraft may make it difficult to meet or maintain aerodynamic performance requirements, such as requirements for coating or paint edge angles or coating or paint edge peaks needed to ensure a preferred aerodynamic performance.

Accordingly, there is a need in the art for improved methods and systems for applying coatings or paints of decorative designs, such as airline livery designs, to exterior surfaces of air vehicles, that provide advantages over known methods and systems.

SUMMARY

This need for improved methods and systems for applying coatings or paints of decorative designs, such as airline livery designs, to exterior surfaces of air vehicles, is satisfied. As discussed in the below detailed description, embodiments of improved methods and systems for applying coatings or paints of decorative designs, such as airline livery designs, to exterior surfaces of air vehicles may provide significant advantages over known methods and systems.

In one embodiment of the disclosure, there is provided a method for applying an aerodynamically functional coating to an exterior surface. The method comprises the step of preparing an uncoated substrate surface to obtain a prepared substrate surface configured to receive an aerodynamically functional coating. The method further comprises applying a primer on the prepared substrate surface to obtain a primed substrate surface with a primer layer. The method further comprises applying and curing a basecoat field color on the primer layer to obtain a basecoat field color layer. The method further comprises masking for a basecoat design color on the basecoat field color layer. The method further comprises applying and curing the basecoat design color on the basecoat field color layer to obtain a first basecoat design color layer. The method further comprises masking for, applying, and curing any subsequent basecoat design color layers on the basecoat field color layer. The method further comprises applying and curing a clearcoat on any visible basecoat field color and any visible basecoat design color layer to obtain a first clearcoat layer. The method further comprises mechanically aero-contouring a plurality of coating edges to obtain an aero-contoured surface. The method further comprises applying to the aero-contoured surface additional clearcoat which is cured, to obtain one or more additional clearcoat layers. The method further comprises obtaining a coated substrate surface coated with the aerodynamically functional coating formed by the basecoat field color layer, the first basecoat design color layer, any subsequent basecoat design color layers, the first clearcoat layer, and the one or more additional clearcoat layers.

In another embodiment of the disclosure, there is provided a method for applying an aerodynamically functional coating to an exterior surface. The method comprises the step of preparing an uncoated substrate surface to obtain a prepared substrate surface configured to receive an aerodynamically functional coating. The method further comprises applying and curing a primer on the prepared substrate surface to obtain a primed substrate surface with a primer layer. The method further comprises applying and curing a monocoat design color on the primer layer to obtain a first monocoat design color layer. The method further comprises applying and curing a clearcoat on the first monocoat design color layer to obtain a first clearcoat layer. The method further comprises masking for, applying, and curing any subsequent monocoat design color layers, and applying and curing any subsequent first clearcoat layers, respectively, on the primer layer. The method further comprises mechanically aero-contouring a plurality of coating edges to obtain an aero-contoured surface. The method further comprises applying to the aero-contoured surface additional clearcoat which is cured, to obtain one or more additional clearcoat layers. The method further comprises obtaining a coated substrate surface coated with the aerodynamically functional coating formed by the first monocoat color layer, the first clearcoat layer, any subsequent monocoat color layers, any subsequent first clearcoat layers, and the one or more additional clearcoat layers.

In another embodiment of the disclosure, there is provided an aero-contoured coating system. The aero-contoured coating system comprises an aerodynamically functional coating. The aerodynamically functional coating comprises at least one or more color layers. The aerodynamically functional coating further comprises one or more first clearcoat layers applied and cured over the one or more color layers to obtain a pre-aero-contoured coating. The one or more first clearcoat layers are preferably configured for abrasion and aero-contouring to obtain an aero-contoured surface. The aerodynamically functional coating comprises one or more additional clearcoat layers applied and cured over the aero-contoured surface. The aero-contoured coating system further comprises a structure having a prepared and primed substrate surface configured to receive the aerodynamically functional coating. The aero-contoured coating system further comprises an aero-contouring device to abrade a plurality of flow surfaces on the pre-aero-contoured coated surface of the aerodynamically functional coating to obtain the aero-contoured surface. The aero-contoured coating system further comprises one or more masking elements for masking the one or more color layers of the aerodynamically functional coating during application of the one or more color layers over the prepared and primed substrate surface.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 4B is an illustration of a cross-sectional view of the pre-aero-contoured coating of FIG. 4A in an assembled form with aero-contouring, an additional clearcoat layer, and an optional optically clear film layer added to form another embodiment of an aero-contoured coating;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1A:
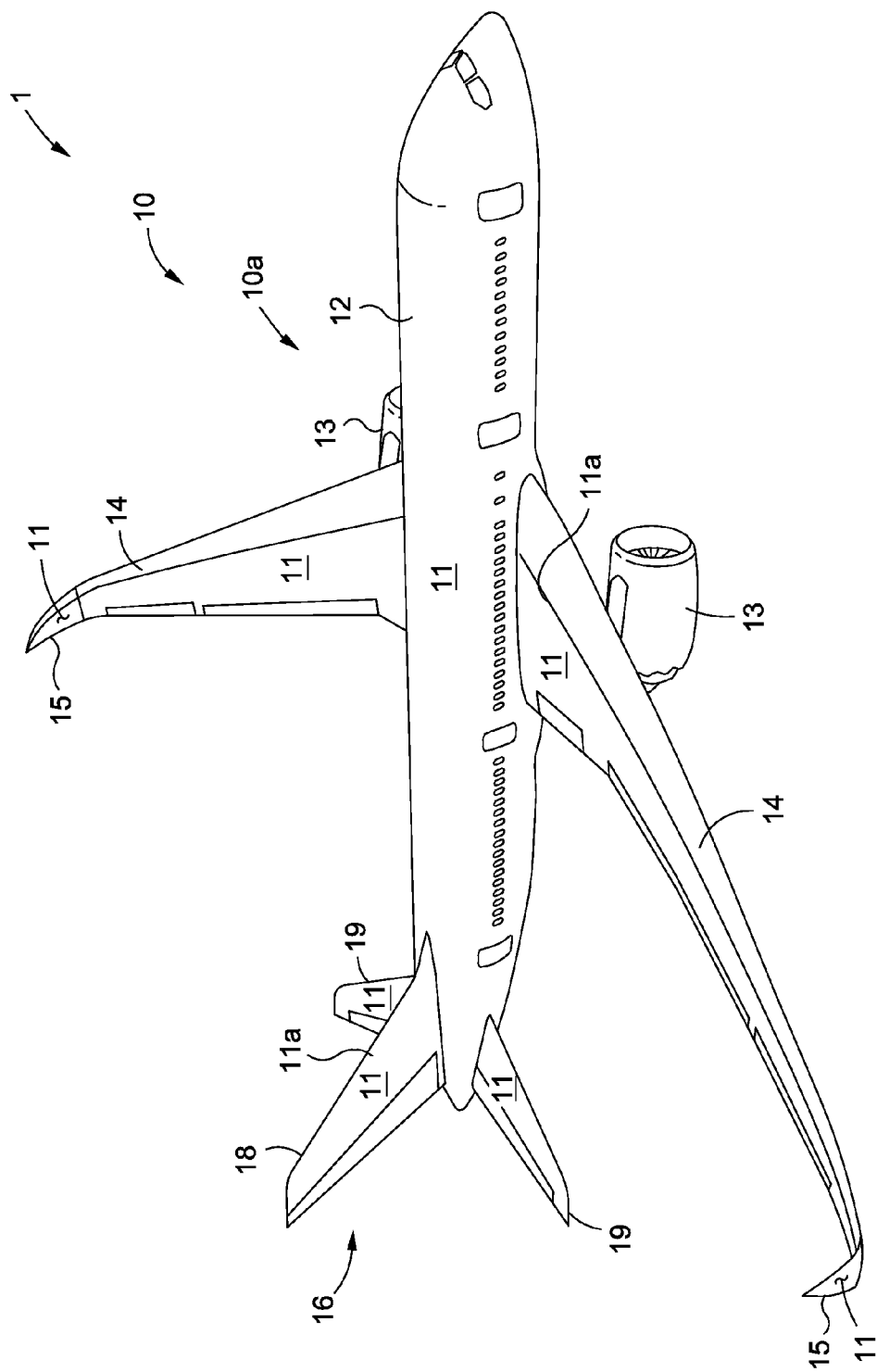
FIG. 1A is an illustration of a perspective view of an air vehicle having one or more exterior surfaces that may be coated with an embodiment of an aerodynamically functional coating using one of the embodiments of a method and a system of the disclosure.

Now referring to the Figures, FIG. 1A is an illustration of a perspective view of a structure 1, such as in the form of an air vehicle 10, for example, an aircraft 10a, having one or more exterior surfaces 11, such as in the form of aerodynamic surfaces 11a, that may be coated or painted with an embodiment of an aerodynamically functional coating 20 (see FIGS. 3C, 4C, 6) using one of the embodiments of a method 80a (see FIG. 2A) or a method 80b (see FIG. 2B), and an aero-contoured coating system 110 (see FIG. 6) of the disclosure.

As shown in FIG. 1A, the air vehicle 10, for example, aircraft 10a, comprises a fuselage 12, nacelles 13, wings 14, winglets 15, and a tail 16 having a vertical stabilizer tail portion 18, and horizontal stabilizer tail portions 19. Although the aircraft 10a shown in FIG. 1A is generally representative of a commercial passenger aircraft having one or more exterior surfaces 11 that may be coated or painted with an embodiment of the aerodynamically functional coating 20 (see FIG. 6) disclosed herein, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures or surfaces that may be coated with an embodiment of the aerodynamically functional coating 20 (see FIG. 1B) using one of the embodiments of the method 80a (see FIG. 2A) or the method 80b (see FIG. 2B), and the aero-contoured coating system 110 (see FIG. 6) of the disclosure.

Figure 1B:
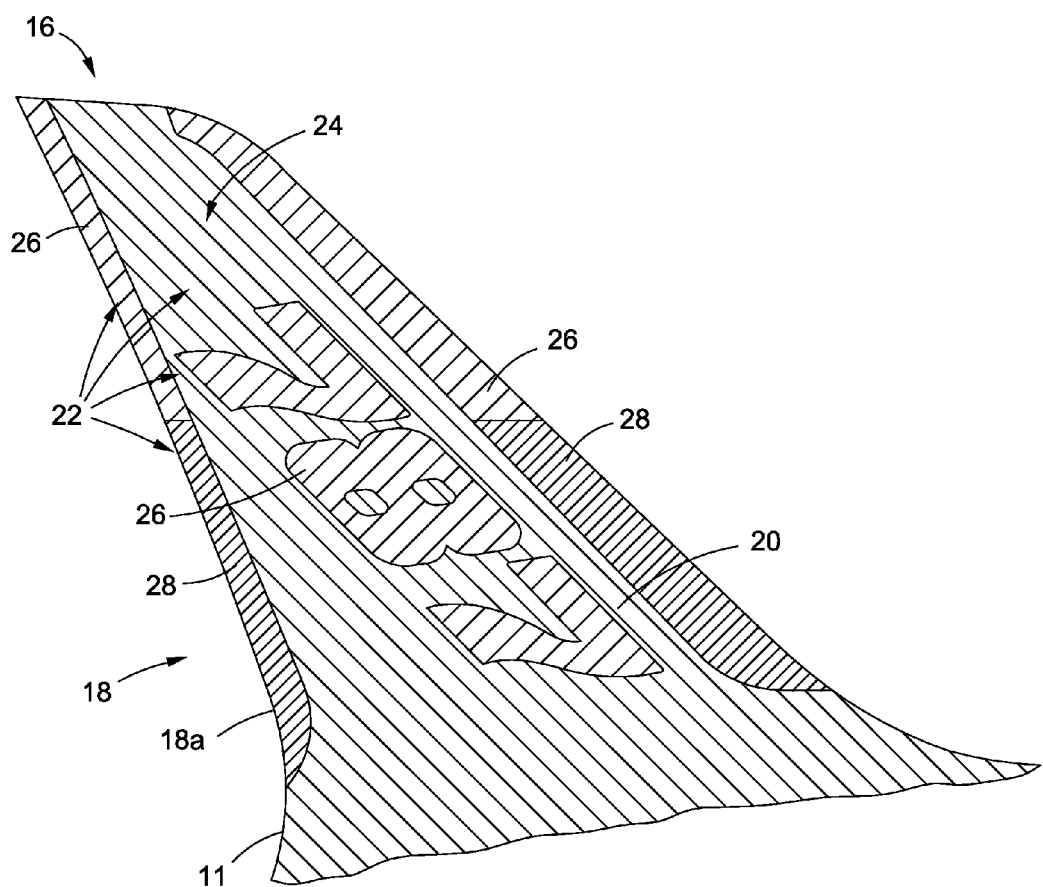
FIG. 1B is an illustration of a side view of the vertical stabilizer tail portion of the tail of FIG. 1A coated with an embodiment of an aerodynamically functional coating using one of the embodiments of a method and a system of the disclosure.

FIG. 1B is an illustration of a side view of the vertical stabilizer tail portion 18 of the tail 16 of FIG. 1A, in the form of an aerodynamically functional coated vertical stabilizer tail portion 18a, coated with an embodiment of the aerodynamically functional coating 20 (see FIGS. 3C, 4C, 6) disclosed herein. As shown in FIG. 1B, the exterior surface 11 of the aerodynamically functional coated vertical stabilizer tail portion 18a is coated with the aerodynamically functional coating 20 in the form of a decorative livery design 22 using one of the embodiments of the method 80a (see FIG. 2A) or the method 80*b* (see FIG. 2B), and the aero-contoured coating system 110 (see FIG. 6) of the disclosure. As further shown in FIG. 1B, the decorative livery design 22 comprises a first coating or paint color 24, such as, for example, a basecoat field color 134 (see FIG. 3A), a second coating or paint color 26, such as, for example, a basecoat design color 136 (see FIG. 3A), and a third coating or paint color 28 abutting the second coating or paint color 26, the third coating or paint color 28 comprising, for example, another basecoat design color 136 (see FIG. 3A). The application of the aerodynamically functional coating 20, such as in the form of decorative livery design 22, using one of the embodiments of the method 80*a* (see FIG. 2A) or the method 80*b* (see FIG. 2B), and the aero-contoured coating system 110 (see FIG. 6) of the disclosure, preferably maintains desired flow characteristics over flow surface areas on the exterior surface 11 (see FIG. 1B) of the decorative livery design 22 (see FIG. 1B) of the vertical stabilizer tail portion 18 (see FIG. 1B), while also preserving decorative appearance.

Figure 2A:
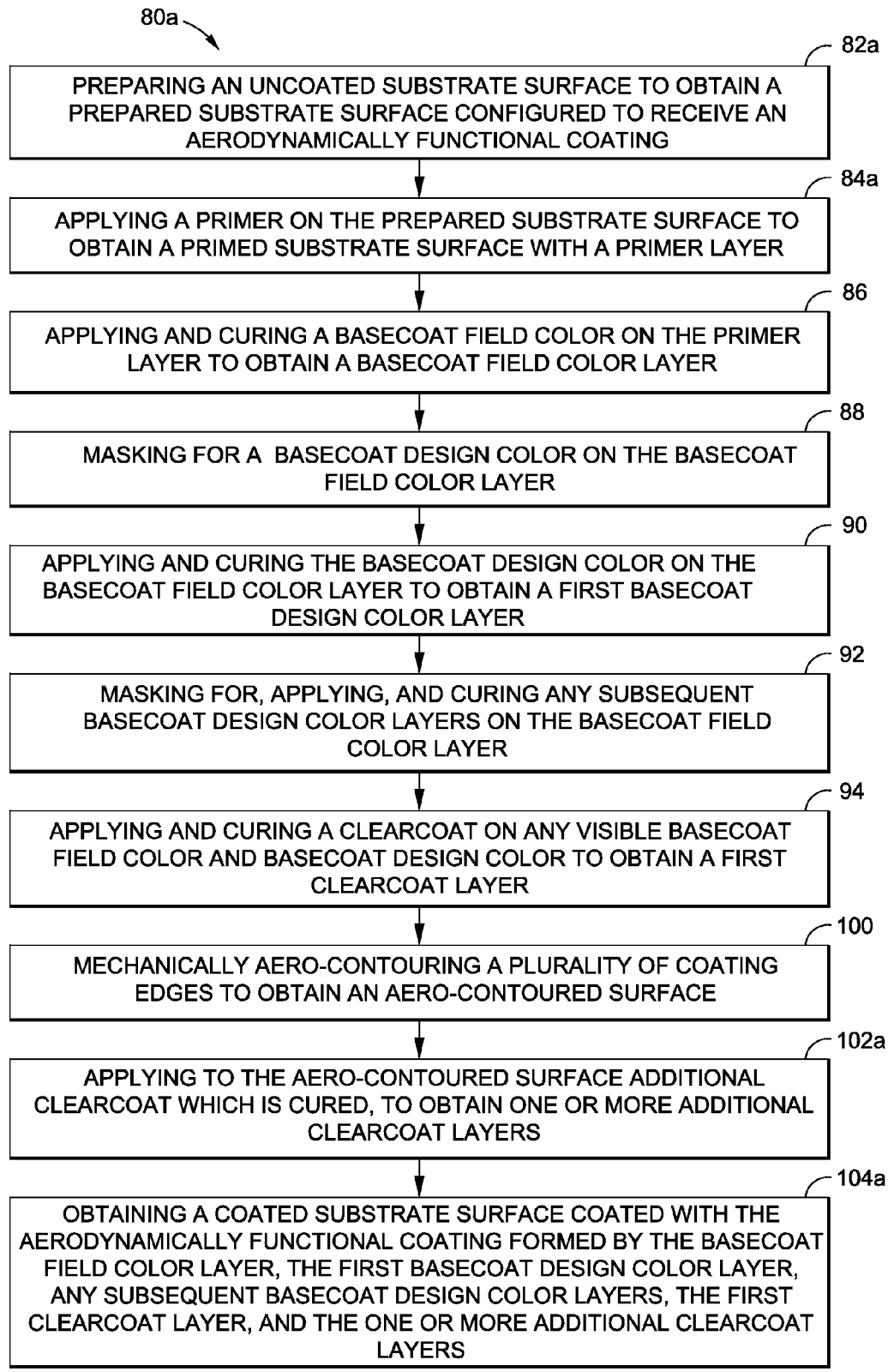
FIG. 2A is a flow diagram of one of the embodiments of a method of the disclosure.
Figure 3A:
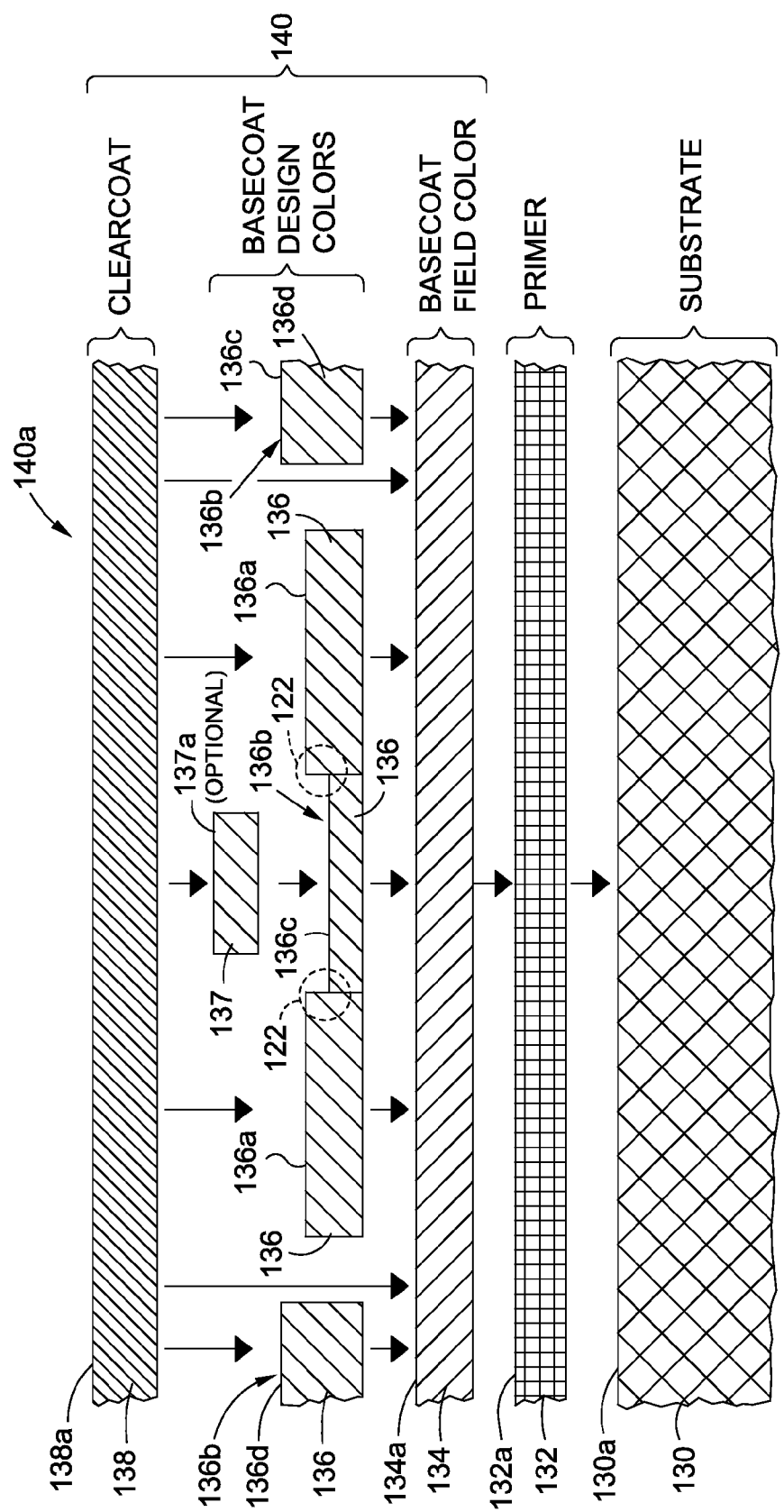
FIG. 3A is an illustration of an exploded cross-sectional view of one of the embodiments of a pre-aero-contoured coating prior to aero-contouring.

In one embodiment of the disclosure, there is provided a method 80*a* for applying an aerodynamically functional coating 20 (see FIGS. 3C, 6), such as in the form of basecoat-clearcoat (BC-CC) aerodynamically functional coating 20*a* (see FIGS. 3C, 6), to an exterior surface 11 (see FIG. 1A), such as in the form of aerodynamic surface 11*a* (see FIG. 1A), of a structure 1 (see FIG. 1A). FIG. 2A is a flow diagram of one of the embodiments of the method 80*a* of the disclosure. As shown in FIG. 2A, the method 80*a* comprises step 82*a* of preparing an uncoated substrate surface 126 (see FIG. 6) of a substrate 130 (see FIGS. 3A, 6) to obtain a prepared substrate surface 130*a* (see FIGS. 3A, 6) configured to receive an aerodynamically functional coating 20 (see FIGS. 3C, 6). FIG. 3A shows a substrate 130 having the prepared substrate surface 130*a*. The substrate 130 may be comprised of a composite material, a metal material, a combination of a composite material and a metal material, or another suitable material. The substrate 130 may be prepared with one or more known preparation processes, such as cleaning, drying, machining, chemically treating, or another suitable preparation process, to obtain the prepared substrate surface 130*a*.

Figure 6:
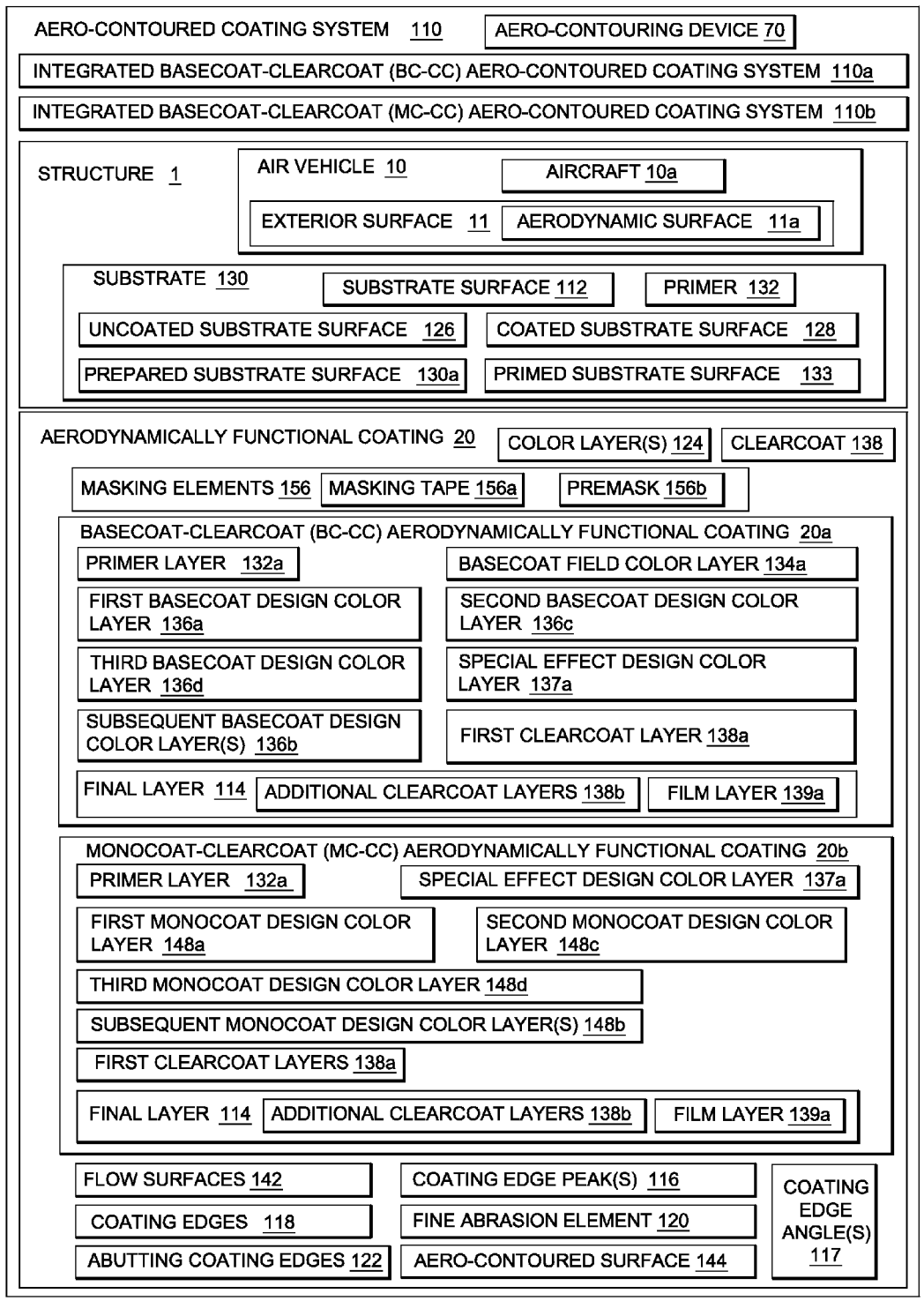
FIG. 6 is a block diagram of an embodiment of an aero-contoured coating system of the disclosure.

The substrate 103 preferably has a substrate surface 112 (see FIG. 6) comprising an exterior surface 11 (see FIG. 6), such as an aerodynamic surface 11*a* (see FIG. 6), of a structure 1 (see FIG. 6). The structure 1 preferably comprises one or more of the tail 16 (see FIG. 1) of the air vehicle 10 (see FIG. 1), including the vertical stabilizer tail portion 18 (see FIG. 1) and horizontal stabilizer tail portions 19 (see FIG. 1); wings 14 (see FIG. 1) of the air vehicle 10 (see FIG. 1), including winglets 15 (see FIG. 1); fuselage 12 (see FIG. 1) of the air vehicle 10 (see FIG. 1); nacelles 13 (see FIG. 1) of the air vehicle 10 (see FIG. 1), or another suitable structure.

As shown in FIG. 2A, the method 80*a* further comprises step 84*a* of applying a primer 132 (see FIG. 3A) on the prepared substrate surface 130*a* (see FIG. 3A) to obtain a primed substrate surface 133 (see FIGS. 3B, 6) with a primer layer 132*a* (see FIG. 3A). The primer 132 may be applied to the prepared substrate surface 130*a*, as needed, and preferably over the entire prepared substrate surface 130*a*. Alternatively, the primer 132 may be built into another coating layer (e.g., basecoat field color layer 134*a* (see FIG. 3A)) applied to the prepared substrate surface 130*a*. The primer 132 may comprise a detail primer that is applied to the substrate surface 130*a* of, for example, a composite component part, when the composite component part is manufactured, and may also comprise an assembly primer that is applied after the composite component part is assembled and in the final coating or paint process. The primer 132 may comprise an epoxy primer such as a water reducible epoxy primer, a solvent based epoxy primer, or another suitable primer. Preferably, the primer layer 132*a* may be applied to an average dry film thickness (dft) from at least about 0.3 mil dft (about 8 microns). More preferably, the primer layer 132*a* may be applied to an average dry film thickness (dft) varying from about 0.3 mil to about 1.0 mil dft (about 8 microns to about 25 microns). If a detail primer and an assembly primer are applied to the prepared substrate surface 130*a*, each of the detail primer layer and the assembly primer layer may preferably be applied to an average dry film thickness (dft) from at least about 0.3 mil dft (about 8 microns), and may more preferably be applied to an average dry film thickness (dft) varying from about 0.3 mil to about 1.0 mil dft (about 8 microns to about 25 microns).

As shown in FIG. 2A, the method 80*a* further comprises step 86 of applying and curing a basecoat field color 134 (see FIG. 3A) on the primer layer 132*a* (see FIG. 3A) to obtain a basecoat field color layer 134*a* (see FIG. 3A). Preferably, the basecoat field color 134 is applied over the entire primer layer 132*a*. The basecoat field color 134 may comprise a white color paint or another suitable color paint. Preferably, the basecoat field color layer 134*a* may be applied to an average dry film thickness (dft) from at least about 1 mil dft (about 25 microns). More preferably, the basecoat field color layer 134*a* may be applied to an average dry film thickness (dft) varying from about 1 mil to about 3 mils dft (about 25 microns to about 76 microns).

As shown in FIG. 2A, the method 80*a* further comprises step 88 of masking for a basecoat design color 136 (see FIG. 3A) on the basecoat field color layer 134*a* (see FIG. 3A). Preferably, the basecoat design color 136 is masked over a part of the basecoat field color layer 134*a*, and the remaining part of the basecoat field color layer 134*a* not covered by the basecoat design color 136 is preferably masked off. Masking the basecoat design color 136 may comprise performing a known masking process, such as performing manual application of one or more masking elements 156 (see FIG. 6), such as in the form of masking tape 156*a* (see FIG. 6) and/or butcher paper (not shown) around the perimeter of the decorative livery design 22 (see FIG. 1B), or such as in the form of paper stencils (not shown) or premasks (not shown) (i.e., a colored or clear film, typically a vinyl film, with an adhesive backing in which a design is cut), which have been pre-cut with the outline of the decorative livery design 22 (see FIG. 1B) that is to be coated or painted, or performing another suitable masking process. Preferably, the one or more masking elements 156 (see FIG. 6), such as in the form of masking tape 156*a* (see FIG. 6) or such as in the form of premask, is sufficiently thin, and preferably has a thickness of from at least about 2 mils (about 51 microns), and more preferably has a thickness of from about 2 mils to about 5 mils (about 51 microns to about 127 microns), and most preferably has a thickness of from about 2 mils to about 3.5 mils (about 51 microns to about 89 microns).

It is advantageous to use thin masking tapes 156*a* (see FIG. 6) and premasks to lay out the decorative livery design 22 (see FIG. 1B). It has been found that the thinner masking tapes 156*a* reduce both a coating or paint edge peak 116 (see FIG. 6) and a coating or paint edge angle 117 (see FIG. 6), as compared to the thicker masking tapes. Such reductions facilitate subsequent coating or paint edge smoothing. Coating or paint edge profiles may be measured using known cross-section photography and known mechanical, optical or laser profilometer procedures. Depending on the complexity of the decorative livery design 22 (see FIG. 1B), it may also be advantageous to wet demask when possible, as this may reduce the coating or paint edge peak 116 (see FIG. 6) and the coating or paint edge angle 117 (see FIG. 6) as well. The coating or paint edge peak 116 may have a coating or paint edge peak height. As used herein, "coating or paint edge peak height" means the difference between a measurement of the lowest point of a coating or paint edge and a measurement of the highest point of a coating or paint edge. As used herein, "coating or paint edge angle means the calculation of an arc tangent of the coating or paint edge peak height divided by the distance between the lowest point of a coating or paint edge and the highest point of a coating or paint edge, or alternatively, a local peak angle along the coating or paint edge.

As shown in FIG. 2A, the method 80a further comprises step 90 of applying and curing the basecoat design color 136 (see FIG. 3A) on the basecoat field color layer 134a (see FIG. 3A) to obtain a first basecoat design color layer 136a (see FIG. 3A). As shown in FIG. 2A, the method 80a further comprises step 92 of masking for, applying, and curing any subsequent basecoat design color layers 136b (see FIG. 3A) on the basecoat field color layer 134a (see FIG. 3A), such that each subsequent basecoat design color layer 136b may overlap the previously applied basecoat design color 136 or basecoat field color 134. As shown in FIG. 3A, several subsequent basecoat design color layers 136b, including a second basecoat design color layer 136c and a third basecoat design color layer 136d, are each masked for, applied, and cured on the basecoat field color layer 134a. A chemical reactivator (not shown) may optionally be applied, if needed, to extend any time needed before subsequent applying and curing of a clearcoat 138 (see FIG. 3A). Preferably, each basecoat design color 136 may be applied to an average dry film thickness (dft) from at least about 0.5 mil dft (about 13 microns). More preferably, each basecoat design color 136 may be applied to an average dry film thickness (dft) varying from about 0.5 mil to about 2.5 mils dft (about 13 microns to about 64 microns).

The method 80a may optionally further comprise after the step 92 of masking for, applying, and curing any subsequent basecoat design color layers 136b on the basecoat field color layer 134a, the step of masking for, applying, and curing one or more special effect design colors 137 (see FIG. 3A) on one or more of the basecoat design colors 136 to obtain one or more special effect design color layer(s) 137a (see FIG. 3A). For example, a special effect design color layer 137a (see FIG. 3A) may be completely or partially applied over the first basecoat design color layer 136a (see FIG. 3A) and/or over one or more of the subsequent basecoat design color layers 136b (see FIG. 3A). As shown in FIG. 3A, the special effect design color 137 is applied over the second basecoat design color layer 136c. In another embodiment, the special effect design color layer 137a (see FIG. 3A) may be applied over the basecoat field color 134. The one or more special effect design colors 137 (see FIG. 3A) may comprise a halftone (i.e., coating or painting technique that simulates continuous tone imagery through the use of dots or a dot matrix, varying either in size, shape (e.g., circles, ovals, diamonds, or other suitable shapes), or spacing); a repetitive decorative pattern such as a dot matrix fade, where the diameter of the circles typically ranges from about 3 (three) inches down to about 0.25 inches; a fade effect; or another coating or paint special effect.

As shown in FIG. 2A, the method 80a further comprises step 94 of applying and curing a clearcoat 138 (see FIG. 3A) on any visible basecoat field color 134 (see FIG. 3A) and any visible basecoat design color 136 (see FIG. 3A) to obtain a first clearcoat layer 138a (see FIG. 3A). FIG. 3A is an illustration of an exploded cross-sectional view of one of the embodiments of a pre-aero-contoured coating 140 prior to aero-contouring and showing a pre-aero-contoured coated surface 140a of the pre-aero-contoured coating 140. FIG. 3A shows the pre-aero-contoured coating 140 comprising the basecoat field color 134, two or more basecoat design colors 136, including a special effect design color 137, and a clearcoat 138 on any visible basecoat field color 134 and any visible basecoat design colors 136. Preferably, the first clearcoat layer 138a may be applied to an average dry film thickness (dft) from at least about 1 mil dft (about 25 microns). More preferably, the first clearcoat layer 138a may be applied to an average dry film thickness (dft) varying from about 1 mil to about 3 mils dft (about 25 microns to about 70 microns).

Figure 3B:
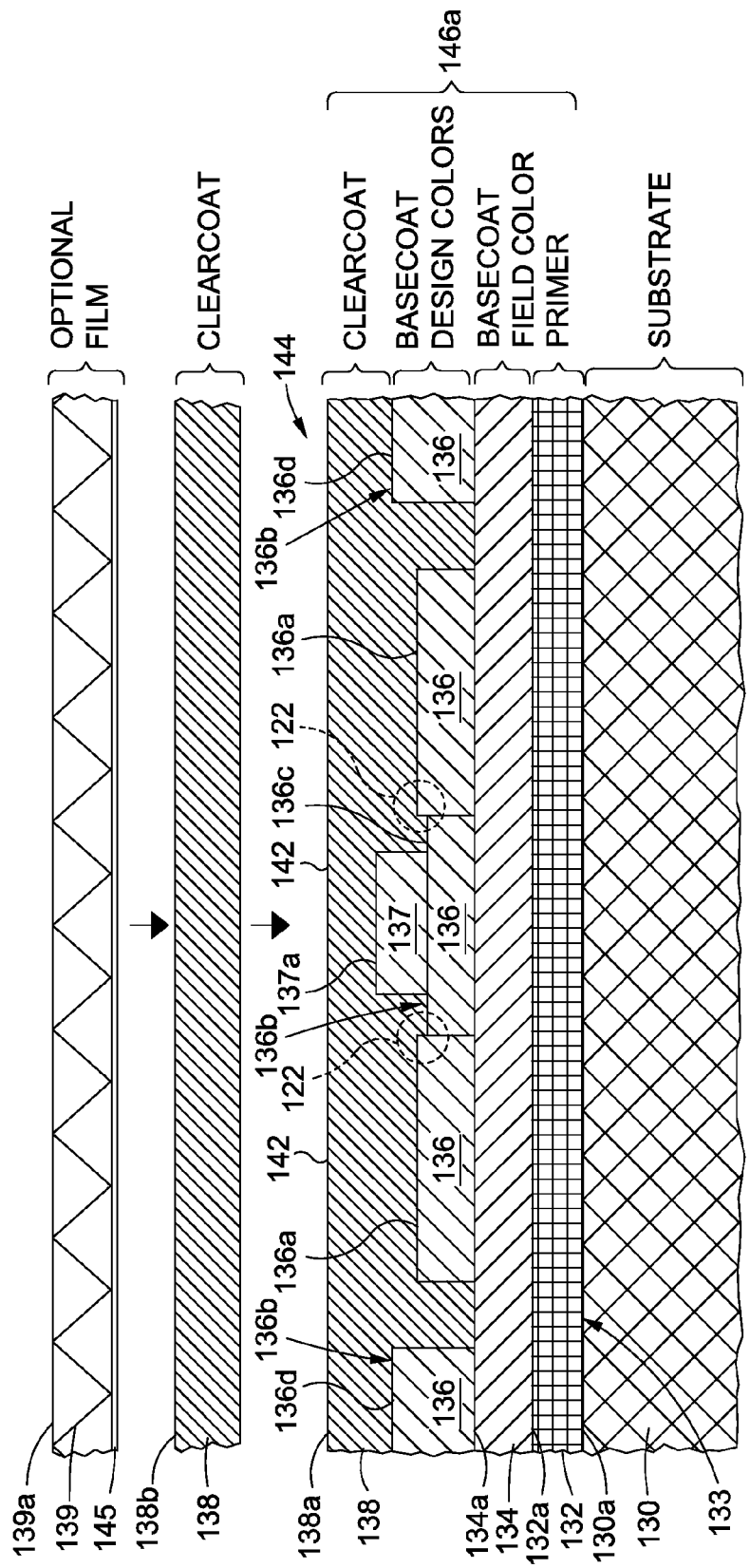
FIG. 3B is an illustration of a cross-sectional view of the pre-aero-contoured coating of FIG. 3A in an assembled form with aero-contouring, an additional clearcoat layer, and an optional optically clear film layer added to form an embodiment of an aero-contoured coating.

As shown in FIG. 2A, the method 80a further comprises step 100 of mechanically aero-contouring a plurality of coating or paint edges 118 (see FIGS. 5A, 6) to obtain an aero-contoured surface 144 (see FIG. 3B). The plurality of coating or paint edges 118 (see FIGS. 5A, 6) may include abutting coating edges 122 (see FIGS. 3A, 6) of the pre-aero-contoured coating 140 (see FIG. 3A). Further, the aero-contouring step 100 preferably reduces one or more coating edge peaks 116 (see FIG. 6) of the coating or paint edges 118 (see FIGS. 5A, 6) and one or more coating edge angles 117 (see FIG. 6) of the coating or paint edges 118 (see FIGS. 5A, 6), including the abutting coating edges 122 (see FIG. 6).

As shown in FIG. 2A, the method 80a further comprises step 102a of applying to the aero-contoured surface 144 (see FIG. 3B) additional clearcoat 138 (see FIG. 3B) which is cured, to obtain one or more additional clearcoat layers 138b (see FIG. 3B). The step 102a of applying to the aero-contoured surface 144 (see FIG. 3B) additional clearcoat 138 further comprises, applying an optically clear film 139 (see FIG. 3B), either over the one or more additional clearcoat layers 138, or in place of the one or more additional clearcoat layers 138, to obtain an optically clear film layer 139a (see FIG. 3B). FIG. 3B is an illustration of a cross-sectional view of the pre-aero-contoured coating 140 of FIG. 3A in an assembled form with aero-contouring, an additional clearcoat layer 138b, and an optional optically clear film layer 139a added to form an embodiment of an aero-contoured coating 146a. As shown in FIG. 3B, the optically clear film layer 139a preferably has an adhesive backing 145. In another embodiment, one or more additional clearcoat layers 138b may be applied over the first clearcoat layer 138a, with no additional optically clear film 139 added over the one or more additional clearcoat layers 138b. In another embodiment, the optically clear film 139 may be added over the first clearcoat layer 138a, with no additional clearcoat layers 138b included. In another embodiment, two additional clearcoat layers 138b may be applied over the first clearcoat layer 138a, and the optically clear film 139 may be added over the two additional clearcoat layers 138b.

Preferably, the one or more additional clearcoat layers 138b (see FIG. 3B) may be applied to an average dry film thickness (dft) with a thickness of from at least about 1 mil (about 25 microns). More preferably, the one or more additional clearcoat layers 138b (see FIG. 3B) may be applied to an average dry film thickness (dft) varying with a thickness in a range of from about 1 mil to about 3 mils (about 25 microns to about 70 microns). Preferably, the one or more additional clearcoat layers 138b may be applied in a sufficient thickness to restore gloss of the coating or paint. This may depend on flow or other factors. The optically clear film layer 139a (see FIG. 3B) preferably has a thickness of from at least about 2 mils (about 51 microns), and more preferably, has a thickness in a range of from about 2 mils to about 25 mils (about 51 microns to about 635 microns).

Figure 3C:
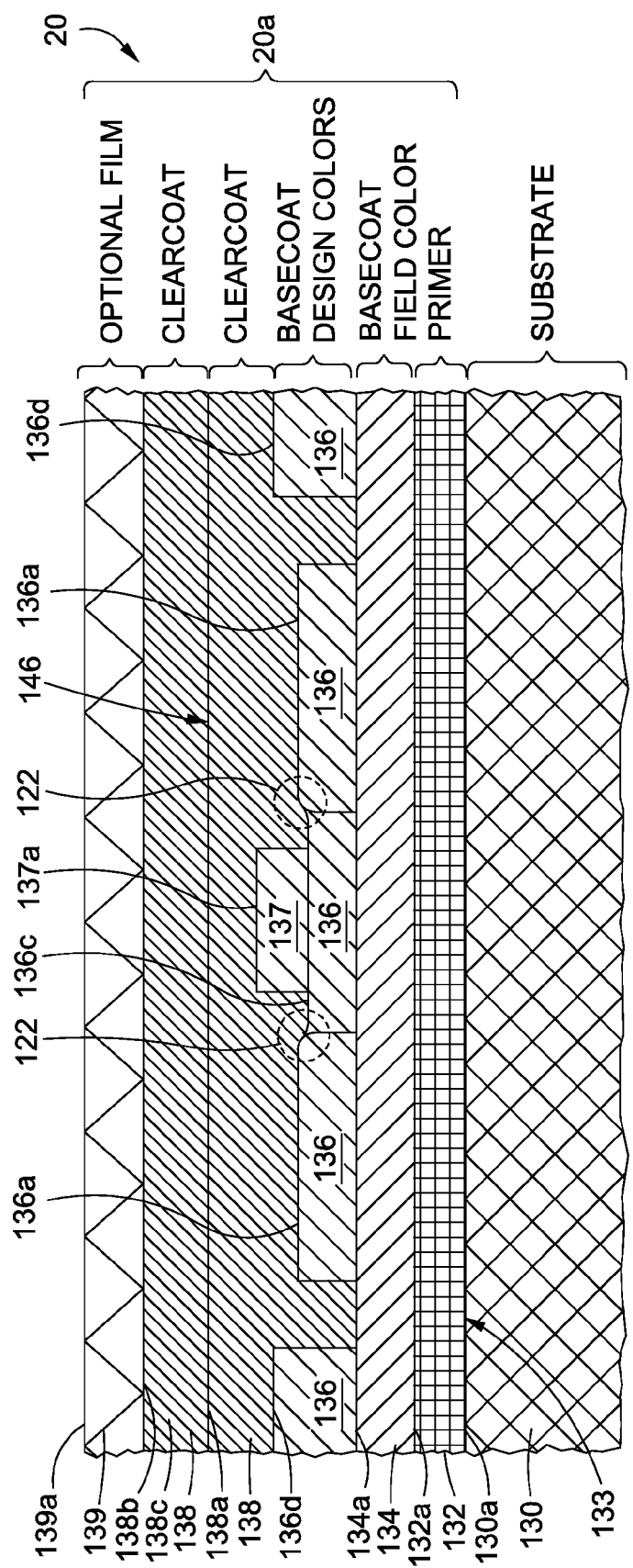
FIG. 3C is an illustration of a cross-sectional view of the aero-contoured coating of FIG. 3B in an assembled form to obtain an embodiment of an aerodynamically functional coating of the disclosure.

As shown in FIG. 2A, the method 80a further comprises step 104a of obtaining a coated substrate surface 128 (see FIG. 6) coated with the aerodynamically functional coating 20 (see FIG. 3C). As shown in FIG. 3C, the aerodynamically functional coating 20, such as in the form of basecoat-clearcoat (BC-CC) aerodynamically functional coating 20a, is preferably formed by the basecoat field color layer 134a, the first basecoat design color layer 136a, any subsequent basecoat design color layers 136b, any optional special effect design color layer 137a, the first clearcoat layer 138a, and the one or more additional clearcoat layers 138b, and/or the optically clear film layer 139a. FIG. 3C is an illustration of a cross-sectional view of the aero-contoured coating 146a of FIG. 3B in an assembled form to obtain an embodiment of the aerodynamically functional coating 20, such as in the form of the basecoat-clearcoat (BC-CC) aerodynamically functional coating 20a, assembled after aero-contouring and after addition of the additional second clearcoat layer 138b, and after addition of the optically clear film layer 139a, all over the primer 132 on the substrate 130. FIG. 3C further shows the aero-contoured coated surface 146. As shown in FIG. 3B, the first basecoat design color layer 136a and the subsequent basecoat design color layers 136b are preferably abutted to each other, and the basecoat field color layer 134a may be typically visible from about 10% to about 90% after application of the basecoat design colors 136. The basecoat design color 136, basecoat field color 134, and the clearcoat 138 used to form the aerodynamically functional coating 20, such as in the form of basecoat-clearcoat (BC-CC) aerodynamically functional coating 20a, may be obtained from AkzoNobel Aerospace Coatings of Waukegan, Ill.

Figure 2B:
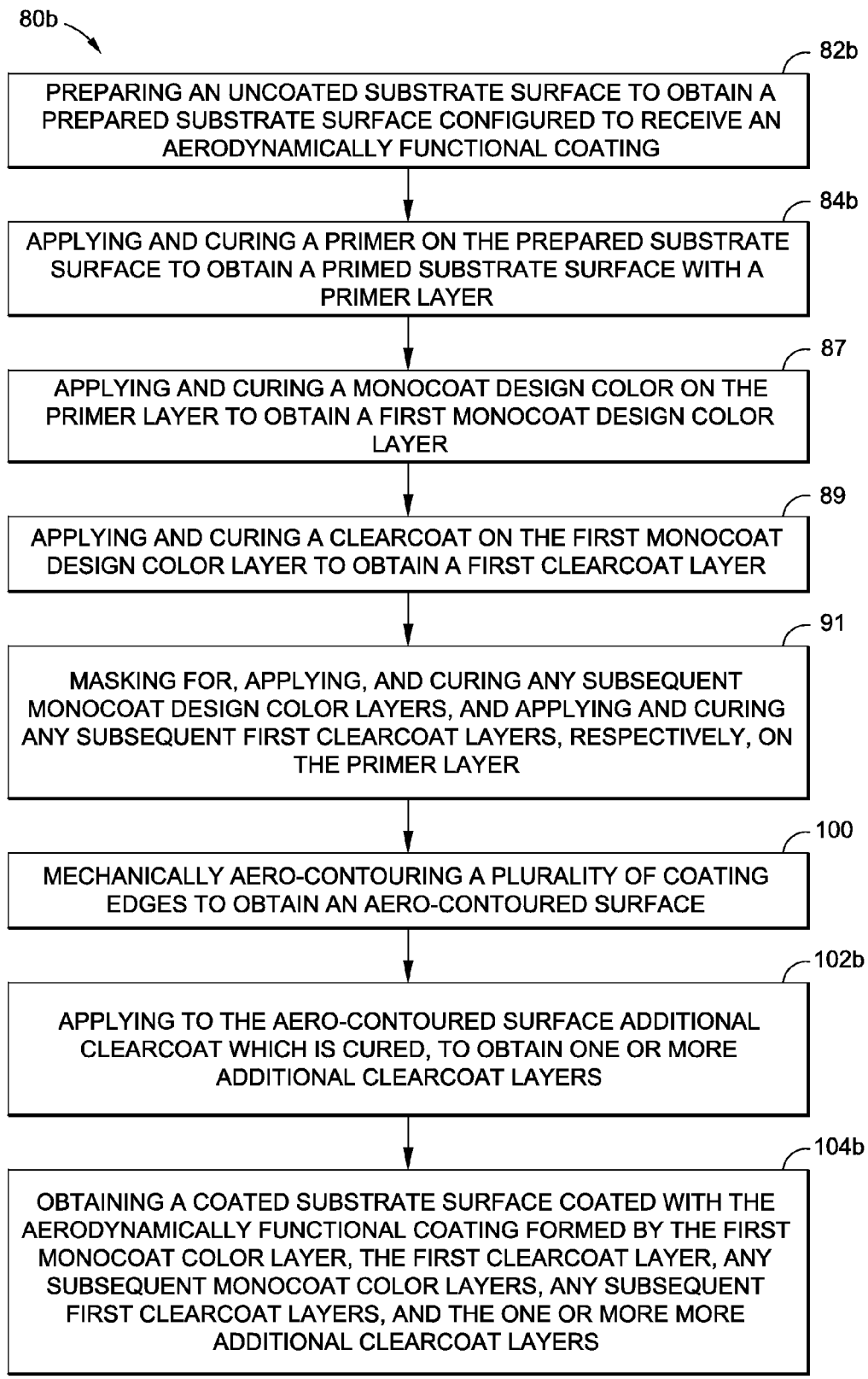
FIG. 2B is a flow diagram of another one of the embodiments of a method of the disclosure.
Figure 4A:
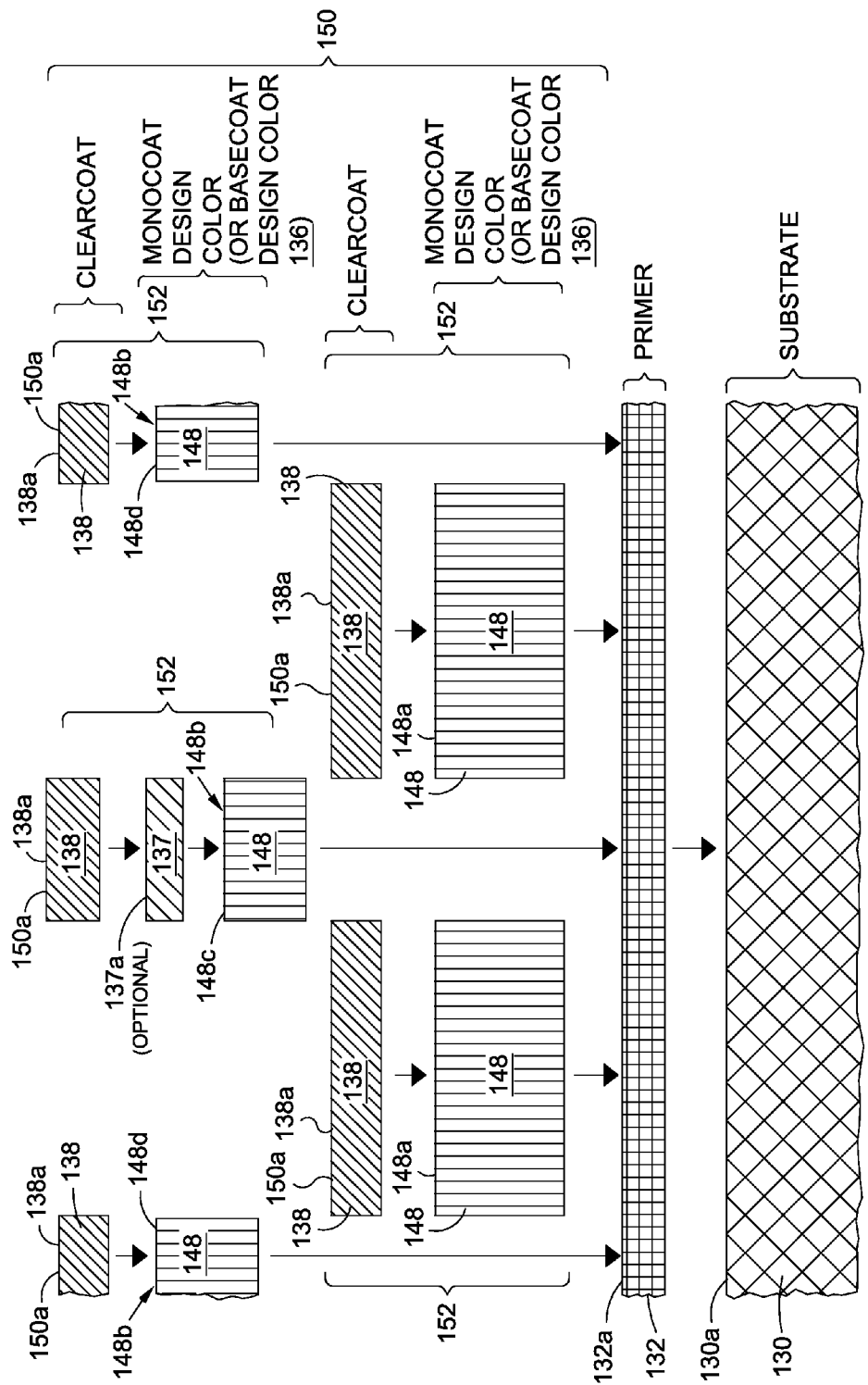
FIG. 4A is an illustration of an exploded cross-sectional view of another one of the embodiments of a pre-aero-contoured coating prior to aero-contouring.

In another embodiment of the disclosure, there is provided a method 80b for applying an aerodynamically functional coating 20 (see FIGS. 4C, 6), such as in the form of a monocoat-clearcoat (MC-CC) aerodynamically functional coating 20b (see FIGS. 4C, 6), to an exterior surface 11 (see FIG. 1A), such as in the form of aerodynamic surface 11a (see FIG. 1A), of a structure 1 (see FIG. 1A). FIG. 2B is a flow diagram of one of the embodiments of the method 80b of the disclosure. As shown in FIG. 2B, the method 80b comprises step 82b of preparing the uncoated substrate surface 126 (see FIG. 6) to obtain the prepared substrate surface 130a (see FIGS. 4A, 6) configured to receive the aerodynamically functional coating 20 (see FIGS. 4C, 6). FIG. 4A shows the substrate 130 having the prepared substrate surface 130a. As discussed above, the substrate 130 may be comprised of a composite material, a metal material, a combination of a composite material and a metal material, or another suitable material. The substrate 130 may be prepared with one or more known preparation processes such as cleaning, drying, machining, chemically treating, or another suitable preparation process, to obtain the prepared substrate surface 130a.

As discussed above, the substrate 130 (see FIGS. 4A, 6) preferably has a substrate surface 112 (see FIG. 6) comprising an exterior surface 11 (see FIG. 6), such as an aerodynamic surface 11a (see FIG. 6) of a structure 1 (see FIG. 6). The structure 1 preferably comprises one or more of the tail 16 (see FIG. 1) of the air vehicle 10 (see FIG. 1), including the vertical stabilizer tail portion 18 (see FIG. 1) and horizontal stabilizer tail portions 19 (see FIG. 1); wings 14 (see FIG. 1) of the air vehicle 10 (see FIG. 1), including winglets 15 (see FIG. 1); fuselage 12 (see FIG. 1) of the air vehicle 10 (see FIG. 1); nacelles 13 (see FIG. 1) of the air vehicle 10 (see FIG. 1), or another suitable structure.

As shown in FIG. 2B, the method 80b further comprises step 84b of applying and curing a primer 132 (see FIG. 4A) on the prepared substrate surface 130a (see FIG. 4A) to obtain the primed substrate surface 133 (see FIGS. 4B, 6) with the primer layer 132a (see FIG. 3A). The primer 132 may be applied to the prepared substrate surface 130a, as needed, and preferably over the entire prepared substrate surface 130a. Alternatively, the primer 132 may be built into another coating layer (e.g., monocoat design color layer 148a (see FIG. 4A)) applied to the prepared substrate surface 130a. As discussed above, the primer 132 may comprise a detail primer that is applied to the substrate surface 130a of, for example, a composite component part, when the composite component part is manufactured, and may also comprise an assembly primer that is applied after the composite component part is assembled and in the final coating or paint process. As discussed above, the primer 132 may comprise an epoxy primer such as a water reducible epoxy primer, a solvent based epoxy primer, or another suitable primer. Preferably, the primer layer 132a may be applied to an average dry film thickness (dft) from at least about 0.3 mil dft (about 8 microns). More preferably, the primer layer 132a may be applied to an average dry film thickness (dft) varying from about 0.3 mil to about 1.0 mil dft (about 8 microns to about 25 microns).

As shown in FIG. 2B, the method 80b further comprises step 87 of applying and curing a monocoat design color 148 (see FIG. 4A) on the primer layer 132a (see FIG. 4A) to obtain a first monocoat design color layer 148a (see FIG. 4A). The monocoat design color 148 is a singe color coating or paint. Preferably, the monocoat design color 148 is applied to all areas on the primer layer 132a in which the monocoat design color 148 will be visible upon completion of the decorative design. Prior to applying the monocoat design color 148 to the primer layer 132a, the primed substrate surface 133 (see FIG. 4B) may be masked except where the monocoat design color 148 will be applied. Alternatively, instead of using a monocoat design color 148 for method 80b, a basecoat design color 136 may be used.

As shown in FIG. 2B, the method 80b further comprises step 89 of applying and curing a clearcoat 138 (see FIG. 4A) on the first monocoat design color layer 148a (see FIG. 4A) to obtain a first clearcoat layer 138a (see FIG. 4A). Preferably, the first clearcoat layer 138a may be applied to an average dry film thickness (dft) from at least about 1 mil dft (about 25 microns). More preferably, the first clearcoat layer 138a may be applied to an average dry film thickness (dft) varying from about 1 mil to about 3 mils dft (about 25 microns to about 70 microns).

As shown in FIG. 2B, the method 80b further comprises step 91 of masking for, applying, and curing any subsequent monocoat design color layers 148b (see FIG. 4A), and applying and curing any subsequent first clearcoat layers 138a, respectively, on the primer layer 132a (see FIG. 4A). As used herein, "curing" means undergoing a full or partial hardening process, with or without heat. As shown in FIG. 4A, several subsequent monocoat design color layers 148b, including a second monocoat design color layer 148c and a third monocoat design color layer 148d, are each masked for, applied, and cured on the primer layer 132a. Optionally, one or more surface portions of the primer layer 132a (see FIG. 4A) to be coated with one or more of the subsequent monocoat design color layers 148b (see FIG. 4A), may be applied and cured. Preferably, a sufficient amount of monocoat design color 148 may be applied and cured over the primer layer 132a (see FIG. 4A), which is cured, so that an average dry film thickness (dft) is preferably less than about 3 mils (70 microns) height between any adjacent first monocoat design color layer 148a (see FIG. 4A) and subsequent monocoat design color layer 148b (see FIG. 4A). More preferably, a sufficient amount of monocoat design color 148 may be applied and cured over the primer layer 132a (see FIG. 4A), which is cured, so that an average dry film thickness (dft) is more preferably less than about 2 mils (51 microns) height between any adjacent first monocoat design color layer 148a (see FIG. 4A) and subsequent monocoat design color layer 148b (see FIG. 4A). Thus, more preferably adjacent monocoat design colors 148 are built up or stacked so that they are less than about 2 mils (51 microns) height of each other and no more than 3 mils height (70 microns) of each other. Additional first clearcoat layers 138a (see FIG. 4A) are preferably applied and cured over each subsequent monocoat design color layer 148b (see FIG. 4A).

The method 80b may optionally further comprise after the step 91 of masking for, applying, and curing any subsequent monocoat design color layers 148b, the step of masking for, applying, and curing one or more special effect design colors 137 (see FIG. 4A) on one or more of the monocoat design colors 148 to obtain one or more special effect design color layer(s) 137a (see FIG. 4A). For example, a special effect design color layer 137a (see FIG. 4A) may be completely or partially applied over the second monocoat design color layer 148c (see FIG. 4A) and/or over one or more of the subsequent monocoat design color layers 148b (see FIG. 4A). As shown in FIG. 4A, the special effect design color 137 is applied over the second monocoat design color layer 148c. The special effect design color 137 (see FIG. 4A) may be applied while the underlying monocoat design color 148 is still wet (not fully cured or even dry) and the clearcoat 138 (see FIG. 4A) is generally applied while the special effect design color 137 is still wet. The special effect design colors 137 (see FIG. 4A) may comprise a halftone (i.e., coating or painting technique that simulates continuous tone imagery through the use of dots or a dot matrix, varying either in size, shape (e.g., circles, ovals, diamonds, or other suitable shapes), or spacing); a repetitive decorative pattern such as a dot matrix fade, where the diameter of the circles typically ranges from about 3 (three) inches down to about 0.25 inches; a fade effect; or another coating or paint special effect.

As shown in FIG. 4A, each first clearcoat layer 138a applied and cured over each subsequent monocoat design color layer 148b preferably together comprise one or more "n" monocoat-clearcoat layers 152 (see FIG. 4A). After the first clearcoat layer 138a (see FIG. 4A) is applied and cured over the first monocoat design color layer 148a (see FIG. 4A) which is also cured, the one or more "n" monocoat-clearcoat layers 152 (see FIG. 4A) may be applied and cured over the primer 132a. Prior to applying each "n" monocoat-clearcoat layer 152 over the primer layer 132a, the previously applied first monocoat design color layer 148a (see FIG. 4A) or any subsequent monocoat design color layer 148b (see FIG. 4A) may be masked except where further monocoat design color 148 will be applied. Masking the first monocoat design color layer 148a (see FIG. 4A) or any subsequent monocoat design color layer 148b may comprise performing a known masking process, such as performing manual application of one or more masking elements 156 (see FIG. 6), such as in the form of masking tape 156a (see FIG. 6) and butcher paper (not shown) around the perimeter of the decorative livery design 22 (see FIG. 1B), or such as in the form of paper stencils (not shown) or premasks (not shown) which have been pre-cut with the outline of the decorative livery design 22 (see FIG. 1B) that is to be coated or painted, or performing another suitable masking process. Preferably, the one or more masking elements 156 (see FIG. 6), such as in the form of masking tape 156a (see FIG. 6) or premask is sufficiently thin, such as preferably having a thickness of from at least about 2 mils (about 51 microns, and more preferably, having a thickness of from about 2 mils to about 5 mils (about 51 microns to about 127 microns), and most preferably, having a thickness of from about 2 mils to about 3.5 mils (about 51 microns to about 89 microns).

Figure 4C:
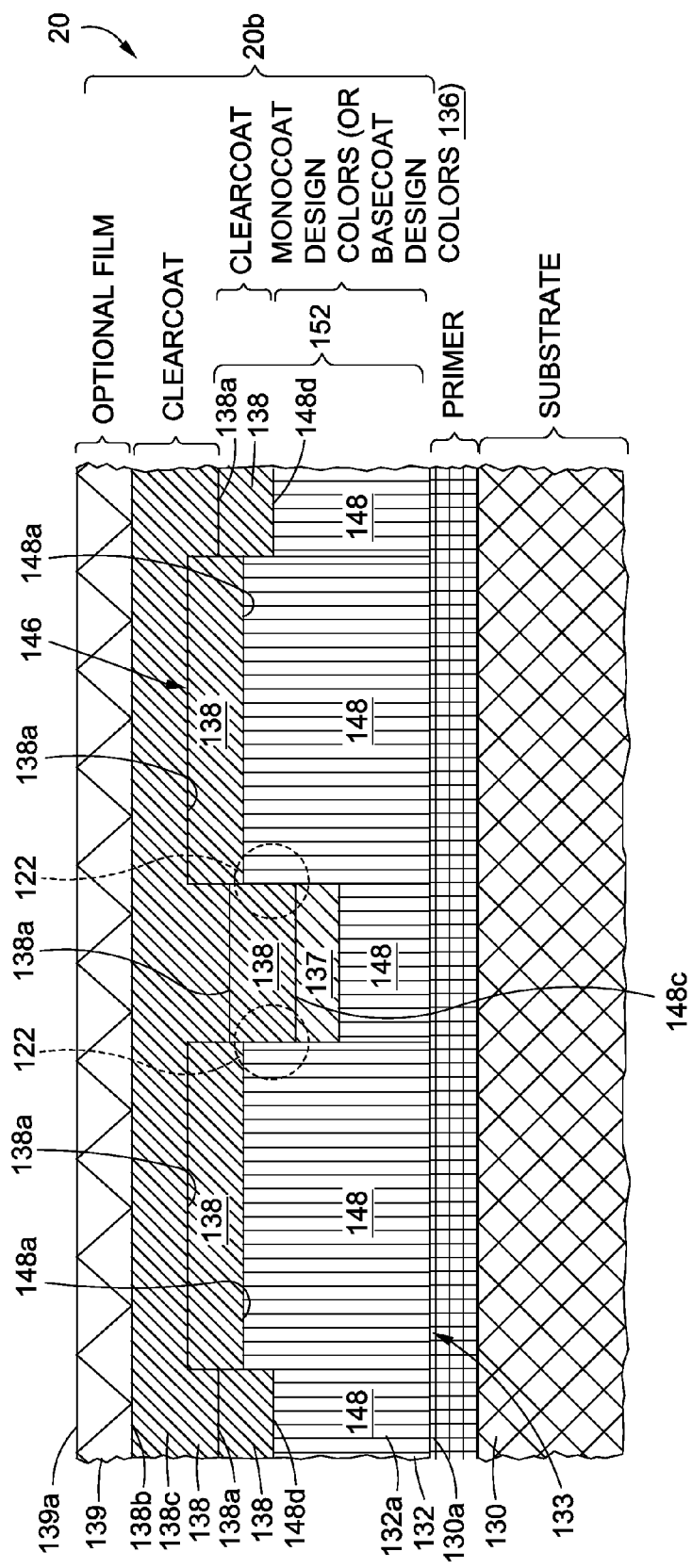
FIG. 4C is an illustration of a cross-sectional view of the aero-contoured coating of FIG. 4B in an assembled form to obtain another embodiment of an aerodynamically functional coating of the disclosure.

As shown in FIG. 2B, the method 80b further comprises step 100 of mechanically aero-contouring a plurality of coating or paint edges 118 (see FIGS. 5A, 6) to obtain an aero-contoured surface 144 (see FIG. 4B). FIG. 4A is an illustration of an exploded cross-sectional view of another one of the embodiments of a pre-aero-contoured coating 150 prior to aero-contouring and showing a pre-aero-contoured coated surface 150a of the pre-aero-contoured coating 150. FIGS. 4A-4C are not to scale in that the vertical direction has been enlarged as compared to the horizontal direction in order to provide detail. FIG. 4A shows the pre-aero-contoured coating 150 comprising the first monocoat design color layer 148a, the first clearcoat layer 138a, and one or more "n" monocoat-clearcoat layers 152, all over the primer layer 132a on the prepared substrate surface 130a. The plurality of coating or paint edges 118 (see FIG. 6) may include abutting coating edges 122 (see FIG. 6) of the pre-aero-contoured coating 150 (see FIG. 4A). Further, the aero-contouring step 100 preferably reduces one or more coating edge peaks 116 (see FIG. 6) of the coating or paint edges 118 (see FIGS. 5A, 6) and one or more coating edge angles 117 (see FIG. 6) of the coating or paint edges 118 (see FIGS. 5A, 6), including the abutting coating edges 122 (see FIG. 6).

As shown in FIG. 2B, the method 80b further comprises step 102b of applying to the aero-contoured surface 144 (see FIG. 4B) additional clearcoat 138 (see FIG. 4B) which is cured, to obtain one or more additional clearcoat layers 138b (see FIG. 4B). The step 102b of applying to the aero-contoured surface 144 (see FIG. 3B) additional clearcoat 138 further comprises, applying an optically clear film 139 (see FIG. 4B), preferably having an adhesive backing 145 (see FIG. 4B), either over the one or more additional clearcoat layers 138 or in place of the one or more additional clearcoat layers 138, to obtain an optically clear film layer 139a (see FIG. 4B). FIG. 4B is an illustration of a cross-sectional view of the pre-aero-contoured coating 150 of FIG. 4A in an assembled form with aero-contouring, the additional clearcoat layer 138b, and the optional optically clear film layer 139a added to form another embodiment of an aero-contoured coating 146b assembled after aero-contouring and prior to addition of either the additional clearcoat layer 138b, and/or the optically clear film layer 139a.

Preferably, the one or more additional clearcoat layers 138b (see FIG. 4B) may be applied to an average dry film thickness (dft) with a thickness of from at least about 1 mil (about 25 microns). More preferably, the one or more additional clearcoat layers 138b (see FIG. 4B) may be applied to an average dry film thickness (dft) varying with a thickness in a range of from about 1 mil to about 3 mils (about 25 microns to about 70 microns). The optically clear film layer 139a (see FIG. 4B) preferably has a thickness of from at least about 2 mils (about 51 microns), and more preferably, has a thickness in a range of from about 2 mils to about 25 mils (about 51 microns to about 635 microns).

As shown in FIG. 2B, the method 80b further comprises step 104b of obtaining a coated substrate surface 128 (see FIG. 6) coated with the aerodynamically functional coating 20 (see FIG. 4C). As shown in FIG. 4C, the aerodynamically functional coating 20, such as in the form of monocoat-clearcoat (MC-CC) aerodynamically functional coating 20a, may be formed of the first monocoat design color layer 148a, the first clearcoat layer 138a, any subsequent monocoat design color layers 148b, such as, for example, the second monocoat design color layer 148c and the third monocoat design color layer 148d, any subsequent first clearcoat layers 138a, and the one or more additional clearcoat layers 138b, and/or, the optically clear film layer 139a. FIG. 4C is an illustration of a cross-sectional view of the aero-contoured coating 146b of FIG. 4B in an assembled form to obtain another embodiment of the aerodynamically functional coating 20, such as in the form of monocoat-clearcoat (MC-CC) aerodynamically functional coating 20a, assembled after aero-contouring and after addition of the additional clearcoat layer 138b, and after addition of the optically clear film layer 139a. FIG. 4C further shows the aero-contoured coated surface 146. The monocoat design color 148 and the clearcoat 138 used to form the aerodynamically functional coating 20, such as in the form of monocoat-clearcoat (MC-CC) aerodynamically functional coating 20b, may be obtained from PPG Aerospace PRC-DeSoto of Mojave, Calif.

Figure 2C:
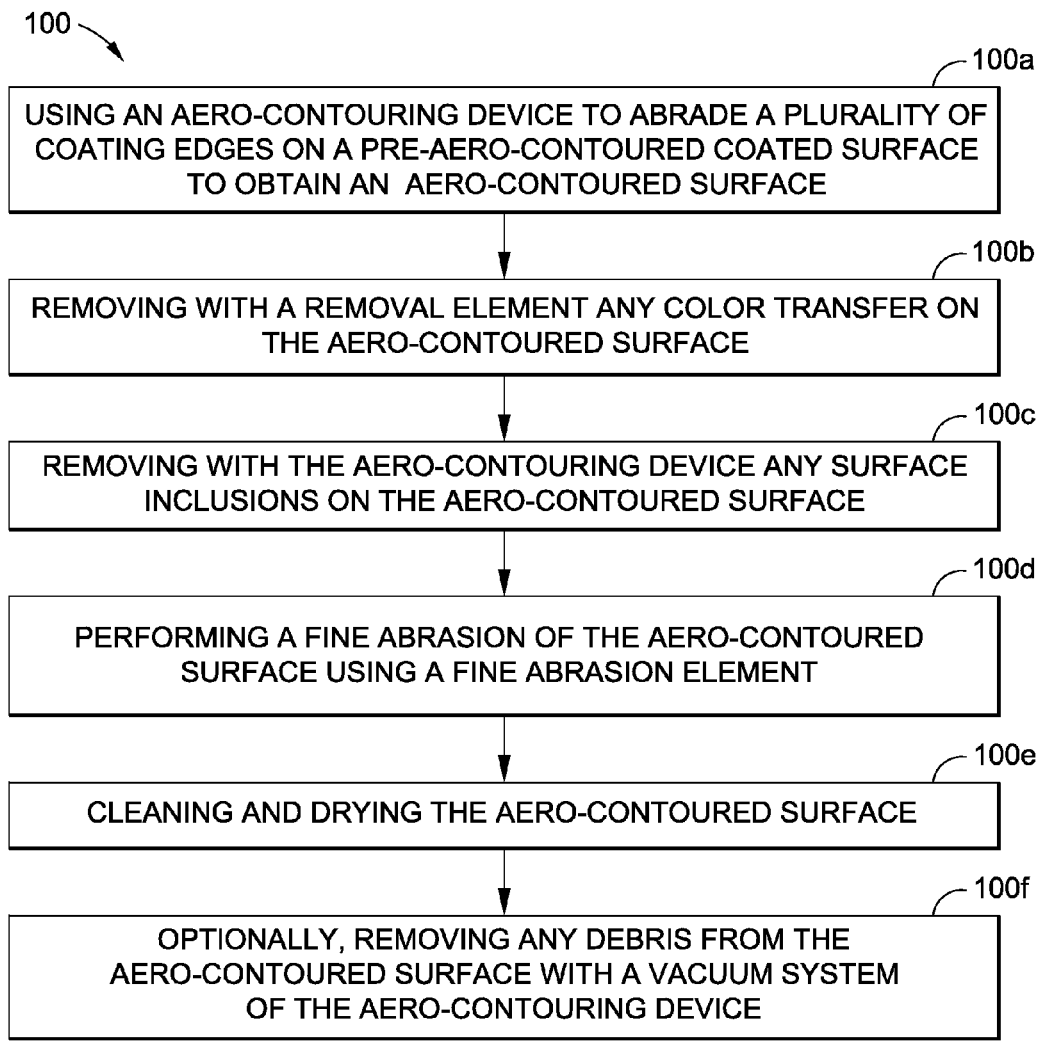
FIG. 2C is a flow diagram of one of the embodiments of mechanically aero-contouring of the disclosure.

FIG. 2C is a flow diagram of one of the embodiments of step 100 of mechanically aero-contouring of the disclosure. The step 100 of mechanically aero-contouring may be used in method 80a shown in FIG. 2A and may also be used in method 80b shown in FIG. 2B.

As shown in FIG. 2C, the step 100 of mechanically aero-contouring comprises sub-step 100a of using an aero-contouring device 70 (see FIG. 6), such as, for example, in the form of a sander device (manual or automated), to abrade the plurality of coating or paint edges 118 (see FIGS. 5A, 6) on the pre-aero-contoured coated surface 140a (see FIG. 3A) or the pre-aero-contoured coated surface 150a (see FIG. 4A) to obtain an aero-contoured surface 144 (see FIGS. 3B, 6). The aero-contouring device 70 (see FIG. 6) is preferably a sanding device having a sanding surface with a diameter preferably less than three (3) inches in size, and with a grit level preferably in a range of from about 240 grit to about 800 grit, and more preferably, in a range of from about 400 grit to about 500 grit.

As shown in FIG. 2C, step 100 further comprises sub-step 100b of removing with a removal element any color transfer between coating or paint colors on the aero-contoured surface 144 (see FIG. 6). Any color transfer from one coating or paint color to another coating or paint color may be removed with a removal element, such as a solvent. Preferably, solvents that do not damage the coating or paint may be used. More preferably, a solvent such as isopropyl alcohol, various naphthas, and isopropyl alcohol naphtha mixtures may be used.

As shown in FIG. 2C, step 100 further comprises sub-step 100c of removing with the aero-contouring device 70 (see FIG. 6) any surface inclusions on the aero-contoured surface 144 (see FIG. 6). Surface inclusions may comprise dust particles, debris particles, dry coating overspray, lint, or other particles that may be present on the aero-contoured surface 144 (see FIG. 6). Three-dimensional surface discontinuities that may occur from such surface inclusions may be even lower than right angle steps.

As shown in FIG. 2C, step 100 further comprises sub-step 100d of performing a fine abrasion of the aero-contoured surface 144 (see FIG. 6) using a fine abrasion element 120 (see FIG. 6), such as a fine abrasive pad that removes gloss from the aero-contoured surface 144 (see FIGS. 3B, 4B). Alternatively, the aero-contouring device 70 may be used to perform the fine abrasion of the aero-contoured surface 144. Sub-step 100d comprises completely abrading the coating or paint edges 118 (see FIG. 6) and flow surfaces 142 (see FIG. 6) in order to blend the appearance of the aero-contoured surface 144 and any non-aero-contoured surfaces. As shown in FIG. 2C, step 100 further comprises sub-step 100e of cleaning and drying the aero-contoured surface 144 (see FIGS. 3B, 4B). As shown in FIG. 2C, step 100 further comprises optional sub-step 100f of removing any debris from the aero-contoured surface 144 (see FIG. 6). The debris may be removed with a known vacuum system that may be attached to the aero-contouring device 70 (see FIG. 6).

In another embodiment of the disclosure, there is provided an aero-contoured coating system 110 (see FIG. 6). FIG. 6 is a block diagram of an embodiment of the aero-contoured coating system 110 of the disclosure. As shown in FIG. 6, in one embodiment, the aero-contoured coating system 110 comprises an integrated basecoat-clearcoat (BC-CC) aero-contoured coating system 110a, and in another embodiment, the aero-contoured coating system 110 comprises an integrated monocoat-clearcoat (MC-CC) aero-contoured coating system 110b.

The preferred embodiment of the aero-contoured coating system 110 is the integrated basecoat-clearcoat (BC-CC) aero-contoured coating system 110a. In the integrated basecoat-clearcoat (BC-CC) aero-contoured coating system 110a, each basecoat design color 136 (see FIG. 3A) layer may be optimized for hide and color uniformity, as well as rapid dry to tape (e.g., masking tape) time, while the clearcoat 138 (see FIG. 3A) may be optimized for coating system durability to provide high gloss as well as solvent and UV (ultra-violet) resistance. The clearcoat 138 is preferably polymeric and contains little or no pigment, so it may have increased flexibility and may be applied over all the basecoat design colors 136 to begin smoothing the coating or paint edges 118 (see FIGS. 5A, 6), including abutting coating edges 122 (see FIG. 6). The one or more additional clearcoat layers 138b (see FIGS. 3B, 6) are preferably sandable and buffable with the aero-contouring device 70 (see FIG. 6).

The integrated monocoat-clearcoat (MC-CC) aero-contoured coating system 110b (see FIG. 6), may require additional processing, such as additional masking and coating or paint application steps, as discussed above with respect to method 80b (see FIG. 2B). With the integrated monocoat-clearcoat (MC-CC) aero-contoured coating system 110b (see FIG. 6), each layer of primer 132 (see FIG. 4A) and each layer of monocoat design color 148 (see FIG. 4A) may be applied to the substrate 130 (see FIG. 4A) or existing primer 132 (see FIG. 4A) rather than on top of each other. This may insure that average variations in the final coating or paint surface profile do not vary by more than a couple of mils, such as 2-3 mils (50-75 microns). The one or more additional clearcoat layers 138b (see FIGS. 4B, 6) are preferably sandable and buffable with the aero-contouring device 70 (see FIG. 6)

As shown in FIG. 6, the aero-contoured coating system 110 further comprises a structure 1, such as a substrate 130 having a substrate surface 112. Preferably, the substrate surface 112 is an uncoated substrate surface 126 which may be prepared with a known preparation process discussed above, to obtain a prepared substrate surface 130a. A primer 132 (see FIG. 3A) may be applied over the prepared substrate surface 130a to obtain a primed substrate surface 133 (see FIG. 6). The prepared and primed substrate surface is preferably configured to receive the aerodynamically functional coating 20. As further shown in FIG. 6, the structure 1, such as the substrate 130 having the substrate surface 112, preferably comprises an exterior surface 11, such as an aerodynamic surface 11a, of the structure 1. As shown in FIG. 6, the structure 1 may comprise an air vehicle 10, such as an aircraft 10a. As shown in FIG. 1A, the structure 1 preferably comprises one or more of the tail 16 of the air vehicle 10, including the vertical stabilizer tail portion 18 and the horizontal stabilizer tail portions 19; wings 14 of the air vehicle 10, including winglets 15; the fuselage 12 of the air vehicle 10; nacelles 13 of the air vehicle 10, or another suitable structure 1.

As shown in FIG. 6, the aero-contoured coating system 110 comprises the aerodynamically functional coating 20. The aerodynamically functional coating 20 preferably comprises a decorative livery design 22 (see FIG. 1B) on the aerodynamic surface 11a (see FIGS. 1A, 6) of the aircraft 10a (see FIGS. 1A, 6). Preferably, the aerodynamically functional coating 20 is configured to maintain aerodynamic requirements over the aerodynamic surface 11a (see FIGS. 1A, 6) of the aircraft 10a (see FIGS. 1A, 6).

As shown in FIG. 6, the aerodynamically functional coating 20 comprises at least one or more color layers 124 (see FIG. 6) and one or more layers of clearcoat 138. The aerodynamically functional coating 20 further comprises a first clearcoat layer 138a (see FIG. 6) applied and cured over the one or more color layers 124 to obtain in one embodiment, a pre-aero-contoured coating 140 (see FIG. 3A), or to obtain in another embodiment, a pre-aero-contoured coating 150 (see FIG. 4A). The first clearcoat layer 138a (see FIG. 3A) is preferably configured for abrasion and aero-contouring to obtain an aero-contoured surface 144 (see FIGS. 3B, 4B). As shown in FIG. 6, the aerodynamically functional coating 20 comprises one or more additional clearcoat layers 138b (see also FIG. 3B) applied and cured over the aero-contoured surface 144 (see FIGS. 3B, 4B).

In one embodiment, as shown in FIGS. 3A-3C, the aerodynamically functional coating 20 comprises the basecoat-clearcoat (BC-CC) aerodynamically functional coating 20a. FIG. 3A is an illustration of an exploded cross-sectional view of one of the embodiments of the pre-aero-contoured coating 140 prior to aero-contouring. FIGS. 3A-3C are not to scale in that the vertical direction has been enlarged as compared to the horizontal direction in order to provide detail. FIG. 3B is an illustration of a cross-sectional view of the pre-aero-contoured coating 140 of FIG. 3A in an assembled form with aero-contouring, the additional clearcoat layer 138b, and the optional optically clear film layer 139a added to form an embodiment of the aero-contoured coating 146a. FIG. 3C is an illustration of a cross-sectional view of the aero-contoured coating 146a of FIG. 3B in an assembled form to obtain an embodiment of the aerodynamically functional coating 20, such as the basecoat-clearcoat (BC-CC) aerodynamically functional coating 20a, of the disclosure. The basecoat-clearcoat (BC-CC) aerodynamically functional coating 20a comprises the basecoat field color layer 134a (see FIG. 3A) applied and cured over the prepared substrate surface 130a (see FIG. 3A) and the primed substrate surface 133 (see FIG. 3B). The basecoat-clearcoat (BC-CC) aerodynamically functional coating 20a further comprises one or more basecoat design colors 136 (see FIG. 3A), such as the first basecoat design color layer 136a (see FIG. 3A), and one or more subsequent basecoat design color layers 136b (see FIG. 3A), applied and cured over the basecoat field color layer 134a (see FIG. 3A). The basecoat-clearcoat (BC-CC) aerodynamically functional coating 20a further comprises the first clearcoat layer 138a (see FIG. 3A) applied and cured on any visible basecoat field color 134 (see FIG. 3A) and any visible basecoat design color 136 (see FIG. 3A). The basecoat-clearcoat (BC-CC) aerodynamically functional coating 20a further comprises one or more additional clearcoat layers 138b (see FIG. 3B), and/or, the optically clear film layer 139a (see FIG. 3B), applied over the aero-contoured surface 144 (see FIG. 3B).

In another embodiment, as shown in FIGS. 4A-4C, the aerodynamically functional coating 20 comprises a monocoat-clearcoat (MC-CC) aerodynamically functional coating 20b. FIG. 4A is an illustration of an exploded cross-sectional view of another one of the embodiments of a pre-aero-contoured coating 150 prior to aero-contouring. FIG. 4B is an illustration of a cross-sectional view of the pre-aero-contoured coating 150 of FIG. 4A in an assembled form with aero-contouring, the additional clearcoat layer 138b, and the optional optically clear film layer 139a added to form an embodiment of the aero-contoured coating 146b. FIG. 4C is an illustration of a cross-sectional view of the aero-contoured coating 146b of FIG. 3B in an assembled form to obtain another embodiment of the aerodynamically functional coating 20, such as the monocoat-clearcoat (MC-CC) aerodynamically functional coating 20b, of the disclosure. The monocoat-clearcoat (MC-CC) aerodynamically functional coating 20b comprises the first monocoat design color layer 148a (see FIG. 4A) applied and cured over the prepared substrate surface 130a (see FIG. 4A) and the primed substrate surface 133 (see FIG. 4B). The monocoat-clearcoat (MC-CC) aerodynamically functional coating 20b further comprises the first clearcoat layer 138a (see FIG. 4A) applied and cured over the first monocoat design color layer 148a (see FIG. 4A). The monocoat-clearcoat (MC-CC) aerodynamically functional coating 20b further comprises one or more subsequent "n" monocoat-clearcoat layers 152 (see FIG. 4A) applied and cured over the primer layer 132 (see FIG. 4A). The monocoat-clearcoat (MC-CC) aerodynamically functional coating 20b further comprises one or more additional clearcoat layers 138b (see FIG. 4B), and/or, the optically clear film layer 139a (see FIG. 4B), applied over the aero-contoured surface 144 (see FIG. 4B).

Figure 5A:
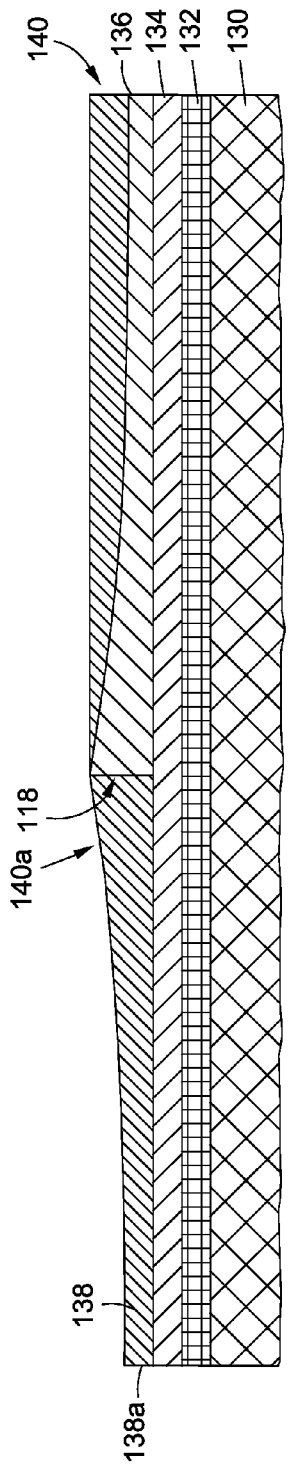
FIG. 5A is an illustration of a cross-sectional view of a pre-aero-contoured coating showing a coating edge of a basecoat design color with a first clearcoat layer over the basecoat design color.

FIG. 5A is an illustration of a cross-sectional view of a pre-aero-contoured coating 140 showing a coating edge 118 of a basecoat design color 136, for example, a red color, with a first clearcoat layer 138a over the basecoat design color 136, and showing the basecoat design color 136 over a basecoat field color 134, for example, a white color, that is masked off with a masking element 156 (see FIG. 6), such as in the form of masking tape 156a (see FIG. 6). As shown in FIG. 5A, a primer 132 is applied and cured on a substrate 130, the basecoat field color 134 is applied and cured on the primer 132, the basecoat design color 136 is applied and cured on the basecoat field color 134, and the first clearcoat layer 138a is applied and cured on the basecoat design color 136. As further shown in FIG. 5A, the coating edge 118 of the basecoat design color 136 is substantially sharp. The clearcoat 138 decreases the coating edge angle 117 (see FIG. 6) between the low point of the clearcoat 138 and the high point of the clearcoat 138 near the coating edge.

Figure 5B:
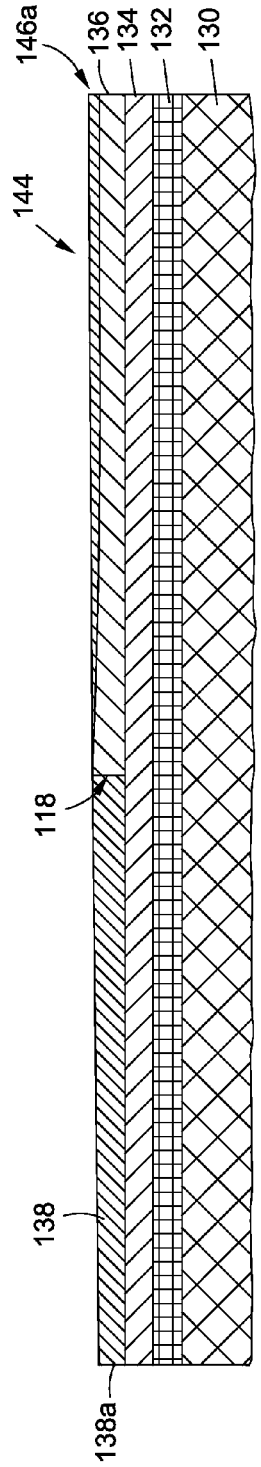
FIG. 5B is an illustration of a cross-sectional view of the pre-aero-contoured coating of FIG. 5A where the pre-aero-contoured coating has been aero-contoured to form an embodiment of an aero-contoured coating.

FIG. 5B is an illustration of a cross-sectional view of the pre-aero-contoured coating 140 of FIG. 5A where the pre-aero-contoured coating 140 has been aero-contoured to form an aero-contoured coating 146a. The aero-contouring process flattens out the coating edge peak 116 (see FIG. 6) and the coating edge angle 117 (see FIG. 6) of the coating edge 118 (see FIG. 5B) of the basecoat design color 136 (see FIG. 5B).

Figure 5C:
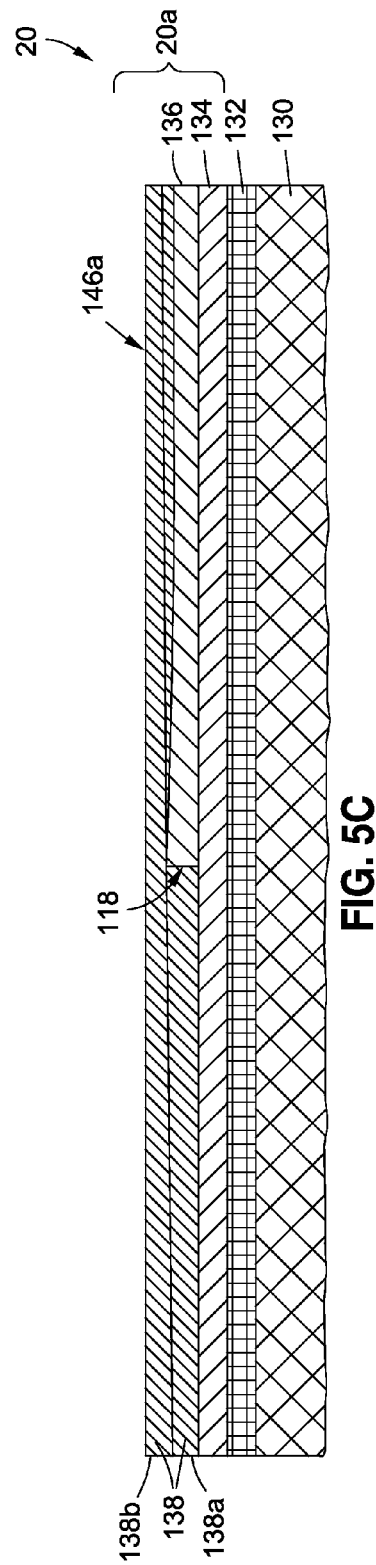
FIG. 5C is an illustration of a cross-sectional view of the aero-contoured coating of FIG. 5B having an additional clearcoat layer added to obtain an embodiment of an aerodynamically functional coating of the disclosure.

FIG. 5C is an illustration of a cross-sectional view of the aero-contoured coating 146a of FIG. 5B having an additional clearcoat layer 138b added to obtain an embodiment of an aerodynamically functional coating 20, such as in the form of a basecoat-monocoat aerodynamically functional coating 20a, of the disclosure. As shown in FIG. 5C, the additional clearcoat layer 138b covers the underlying first clearcoat layer 138a and the basecoat design color 136 completely. The aero-contouring process with the additional clearcoat layer 138b reduced both the coating edge peak 116 (see FIG. 6) and the coating edge angle 117 (see FIG. 6) of the coating or paint edge 118 (see FIG. 5C) of the basecoat design color 136 (see FIG. 5C). The coating edge peak 116 (see FIG. 6) and the coating edge angle 117 (see FIG. 6) were measured by known cross-section photography and known mechanical, optical, or laser profilometer procedures.

As shown in FIG. 6, the aero-contoured coating system 110 further comprises an aero-contouring device 70 to abrade a plurality of flow surfaces 142 on the pre-aero-contoured coated surface 140a (see FIG. 3A) of one embodiment, or on the pre-aero-contoured coated surface 150a (see FIG. 4A) of another embodiment, of the aerodynamically functional coating 20 to obtain the aero-contoured surface 144 (see FIGS. 3B, 4B). The plurality of coating or paint edges 118 (see FIGS. 5A, 6) may include abutting coating edges 122 (see FIG. 6) of, for example, the pre-aero-contoured coating 140 (see FIG. 3A). Further, the aero-contouring device 70 preferably 100 reduces one or more coating edge peaks 116 (see FIG. 6) of the coating or paint edges 118 (see FIGS. 5A, 6) and one or more coating edge angles 117 (see FIG. 6) of the coating or paint edges 118 (see FIGS. 5A, 6), including the abutting coating edges 122 (see FIG. 6).

As shown in FIG. 6, the aero-contoured coating system 110 further comprises one or more masking elements 156 for masking the one or more color layers 124 of the aerodynamically functional coating 20 during application of the one or more color layers 124 over the prepared and primed substrate surface. The masking elements 156 may preferably comprise thin tapes, such as masking tape 156a (see FIG. 6) and pre-masks to lay out the decorative livery design 22 (see FIG. 1B). It may also be preferable to wet demask when possible as this may reduce the coating edge peak 116 (see FIG. 6) and the coating edge angle 117 (see FIG. 6) as well. The ability to wet demask successfully may depend on the complexity of the decorative livery design 22 (see FIG. 1B).

Figure 7:
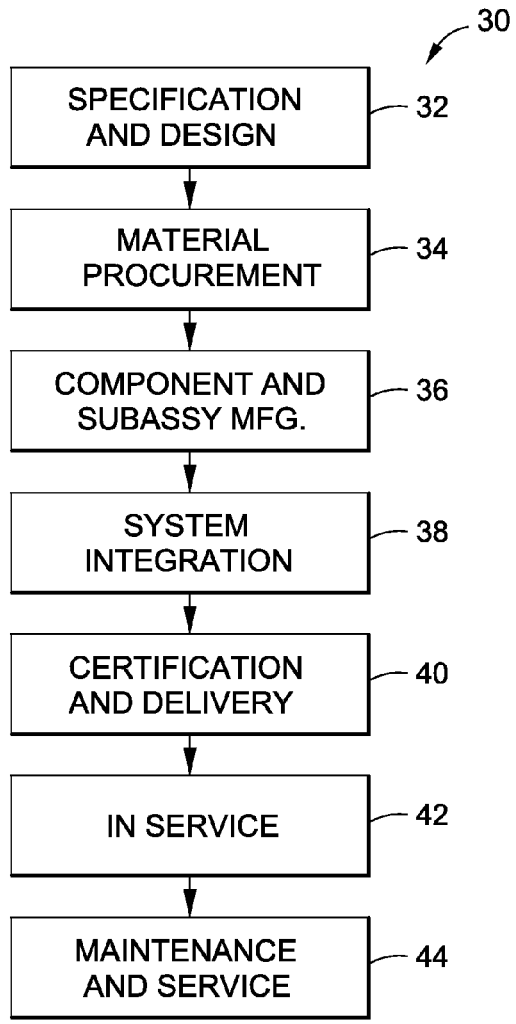
FIG. 7 is a flow diagram of an aircraft manufacturing and service method.
Figure 8:
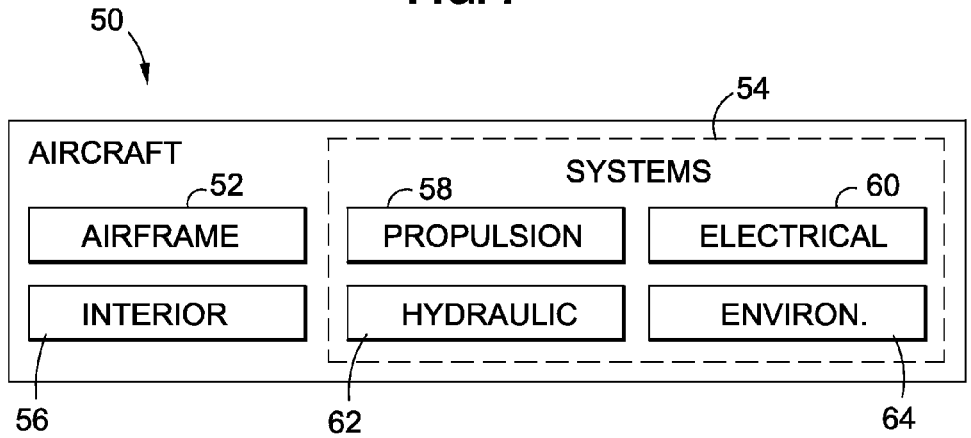
FIG. 8 is a block diagram of an aircraft.

FIG. 7 is a flow diagram of an aircraft manufacturing and service method 30. FIG. 8 is a block diagram of an aircraft 50. Referring to FIGS. 7-8, embodiments of the disclosure may be described in the context of the aircraft manufacturing and service method 30 as shown in FIG. 7 and the aircraft 50 as shown in FIG. 8. During pre-production, exemplary aircraft manufacturing and service method 30 may include specification and design 32 of the aircraft 50 and material procurement 34. During production, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 may be scheduled for routine maintenance and service 44 (which may also include modification, reconfiguration, refurbishment, and other suitable services).

Each of the processes of aircraft manufacturing and service method 30 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 8, the aircraft 50 produced by exemplary aircraft manufacturing and service method 30 may include an airframe 52 with a plurality of systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the invention may be applied to other industries, such as the automotive industry.

Methods and systems embodied herein may be employed during any one or more of the stages of the aircraft manufacturing and service method 30. For example, components or subassemblies corresponding to component and subassembly manufacturing 36 may be fabricated or manufactured in a manner similar to components or subassemblies produced while the aircraft 50 is in service. Also, one or more system embodiments, method embodiments, or a combination thereof, may be utilized during component and subassembly manufacturing 36 and system integration 38, for example, by substantially expediting assembly of or reducing the cost of the aircraft 50. Similarly, one or more of system embodiments, method embodiments, or a combination thereof, may be utilized while the aircraft 50 is in service, for example and without limitation, to maintenance and service 44.

Embodiments of the method 80a (see FIG. 2A), method 80b (see FIG. 2B), and aero-contoured coating system 110 (see FIG. 6) have numerous advantages and provide for the application of exterior decorative aerodynamically functional coatings that meet the aerodynamic requirements that may be applicable to both basecoat-clearcoat (BC-CC) or monocoat-clearcoat (MC-CC) systems involves the aero-contouring of masked edges followed by the addition of a additional clearcoat layers 138b (see FIG. 6); that may be used during airline repaints and may be done when removable panels are removed for inspection and service; that may be used by any other aircraft and on other aircraft surfaces, such as winglets 15 (see FIG. 1A) or vertical stabilizer tail portion 18 (see FIG. 1A) where smooth coating or paint edges are desired to retain desired flow characteristics; and that may be used on non-decorative areas, such as wings 14 (see FIG. 1A) and horizontal stabilizer tail portions 19 (see FIG. 1A), where there is a need for inclusion removal or repair. In addition, embodiments of the method 80a (see FIG. 2A), method 80b (see FIG. 2B), and aero-contoured coating system 110 (see FIG. 6) may decrease coating edge peaks 116 (see FIG. 6) and/or coating edge angles 117 (see FIG. 6) in order to ensure a preferred aerodynamic performance.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method for applying an aerodynamically functional coating to an exterior surface, the method comprising the steps of:

preparing an uncoated substrate surface to obtain a prepared substrate surface configured to receive an aerodynamically functional coating;

applying a primer on the prepared substrate surface to obtain a primed substrate surface with a primer layer;

applying and curing a basecoat field color on the primer layer to obtain a basecoat field color layer;

masking for a basecoat design color on the basecoat field color layer;

applying and curing the basecoat design color on the basecoat field color layer to obtain a first basecoat design color layer;

masking for, applying, and curing any subsequent basecoat design color layers on the basecoat field color layer;

applying and curing a clearcoat on any visible basecoat field color and any visible basecoat design color to obtain a first clearcoat layer;

mechanically aero-contouring a plurality of coating edges to reduce one or more coating edge peaks and coating edge angles of abutting coating edges between the basecoat design color layers, to obtain an aero-contoured surface that retains desired flow characteristics and ensures aerodynamic performance;

applying to the aero-contoured surface additional clearcoat which is cured, to obtain one or more additional clearcoat layers; and, obtaining a coated substrate surface coated with the aerodynamically functional coating formed by the basecoat field color layer, the first basecoat design color layer, any subsequent basecoat design color layers, the first clearcoat layer, and the one or more additional clearcoat layers.

2. The method of claim 1 wherein the aero-contouring step comprises the sub-steps of:

using an aero-contouring device to abrade the plurality of coating edges on a pre-aero-contoured coated surface to obtain the aero-contoured surface;

removing with a removal element any color transfer on the aero-contoured surface;

removing with the aero-contouring device any surface inclusions on the aero-contoured surface;

performing a fine abrasion of the aero-contoured surface using a fine abrasion element; and, cleaning and drying the aero-contoured surface.

3. The method of claim 1, wherein the step of applying additional clearcoat further comprises applying an optically clear film, either over the one or more additional clearcoat layers or in place of the one or more additional clearcoat layers, to obtain an optically clear film layer.

4. The method of claim 3, wherein the first clearcoat layer and the one or more additional clearcoat layers each have a thickness of from at least about 1 mil, and wherein the optically clear film layer has a thickness of from at least about 2 mils.

5. The method of claim 1, wherein the aero-contouring step flattens out the one or more coating edge peaks and coating edge angles of the abutting coating edges between the basecoat design color layers.

6. The method of claim 1 further comprising after the step of masking for, applying, and curing any subsequent basecoat design color layers on the basecoat field color layer, the step of masking for, applying with a painting technique, and curing one or more special effect design color layers on the first basecoat design color layer or on one or more of the subsequent basecoat design color layers.

7. The method of claim 1, wherein the exterior surface comprises an aerodynamic surface of a structure, the structure comprising one or more of a tail of an air vehicle, including a vertical stabilizer tail portion and horizontal stabilizer tail portions; wings of an air vehicle, including winglets; fuselage of an air vehicle; and nacelles of an air vehicle.

8. A method for applying an aerodynamically functional coating to an exterior surface, the method comprising the steps of:

preparing an uncoated substrate surface to obtain a prepared substrate surface configured to receive an aerodynamically functional coating;

applying and curing a primer on the prepared substrate surface to obtain a primed substrate surface with a primer layer;

applying and curing a monocoat design color on the primer layer to obtain a first monocoat design color layer;

applying and curing a clearcoat on the first monocoat design color layer to obtain a first clearcoat layer;

masking for, applying, and curing any subsequent monocoat design color layers, and applying and curing any subsequent first clearcoat layers, respectively, on the primer layer;

mechanically aero-contouring a plurality of coating edges to reduce one or more coating edge peaks and coating edge angles of abutting coating edges between the monocoat design color layers, to obtain an aero-contoured surface that retains desired flow characteristics and ensures aerodynamic performance;

applying to the aero-contoured surface additional clearcoat which is cured, to obtain one or more additional clearcoat layers; and, obtaining a coated substrate surface coated with the aerodynamically functional coating formed by the first monocoat design color layer, the first clearcoat layer, any subsequent monocoat design color layers, any subsequent first clearcoat layers, and the one or more additional clearcoat layers.

9. The method of claim 8 wherein the aero-contouring step comprises the sub-steps of:

smoothing and sanding the plurality of coating edges on a pre-aero-contoured coated surface via mechanical abrasion with an aero-contouring device to obtain the aero-contoured surface;

removing with a removal element any color transfer on the aero-contoured surface;

removing with the aero-contouring device any surface inclusions on the aero-contoured surface;

performing a fine abrasion of the aero-contoured surface using a fine abrasion element; and, cleaning and drying the aero-contoured surface.

10. The method of claim 8, wherein the step of applying additional clearcoat further comprises applying an optically clear film, either over the one or more additional clearcoat layers or in place of the one or more additional clearcoat layers, to obtain an optically clear film layer.

11. The method of claim 10, wherein the first clearcoat layer, any subsequent first clearcoat layers, and the one or more additional clearcoat layers each have a thickness of from at least about 1 mil, and wherein the optically clear film layer has a thickness of from at least about 2 mils.

12. The method of claim 8, wherein the aero-contouring step flattens out the one or more coating edge peaks and coating edge angles of the abutting coating edges between the monocoat design color layers.

13. The method of claim 8, further comprising after the step of masking for, applying, and curing any subsequent monocoat design color layers, the step of masking for, applying with a painting technique, and curing one or more special effect design color layers on the first monocoat design color layer or on one or more of the subsequent monocoat design color layers.

14. The method of claim 8, wherein the exterior surface comprises an aerodynamic surface of a structure, the structure comprising one or more of a tail of an air vehicle, including a vertical stabilizer tail portion and horizontal stabilizer tail portions; wings of an air vehicle, including winglets; fuselage of an air vehicle; and nacelles of an air vehicle.

* * * * *